United States Patent
Matityahu et al.

(10) Patent No.: US 9,749,261 B2
(45) Date of Patent: *Aug. 29, 2017

(54) ARRANGEMENTS AND METHODS FOR MINIMIZING DELAY IN HIGH-SPEED TAPS

(71) Applicant: Net Optics, Inc., Calabasas, CA (US)

(72) Inventors: Eldad Matityahu, Palo Alto, CA (US); Robert Shaw, Los Gatos, CA (US); Shlomo Gurfinkel, Santa Clara, CA (US); Siuman Hui, Millbrae, CA (US)

(73) Assignee: IXIA, Calabasas, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 13/944,801

(22) Filed: Jul. 17, 2013

(65) Prior Publication Data

US 2014/0022891 A1    Jan. 23, 2014

Related U.S. Application Data

(63) Continuation-in-part of application No. 13/034,730, filed on Feb. 25, 2011, now Pat. No. 8,902,735.
(Continued)

(51) Int. Cl.
*H04L 12/931* (2013.01)
*H04L 12/26* (2006.01)
(Continued)

(52) U.S. Cl.
CPC ............ *H04L 49/205* (2013.01); *H04L 12/10* (2013.01); *H04L 41/0668* (2013.01); *H04L 43/12* (2013.01)

(58) Field of Classification Search
None
See application file for complete search history.

(56) References Cited

U.S. PATENT DOCUMENTS 3,445,683 A * 5/1969 Traina .......................... 327/445
4,802,161 A   1/1989 Byars et al.
(Continued)

FOREIGN PATENT DOCUMENTS

AU    2010258799    6/2016
EP      2091199     8/2009
(Continued)

OTHER PUBLICATIONS

Note of Allowance for U.S. Appl. No. 13/034,730 (dated Jul. 30, 2014).
(Continued)

*Primary Examiner* — Tejis Daya
(74) *Attorney, Agent, or Firm* — Jenkins, Wilson, Taylor & Hunt, P.A.

(57) ABSTRACT

Methods and arrangements are provided for minimizing delay in a high-speed tap arrangement are disclosed and include hardware and software arrangements and methods for quickly switching the transmission path for data between a primary data path and a bypass data path. The switching is accomplished rapidly using set of powered analog switches and a relay to minimize packets loss in the event of power loss. Further, when power is restored, software and hardware methods and arrangements disclosed herein permit the data path to be promptly restored resulting in the restoration of tapping ability quickly after power is restored.

3 Claims, 16 Drawing Sheets

Related U.S. Application Data

(60) Provisional application No. 61/308,981, filed on Feb. 28, 2010.

(51) Int. Cl.
   *H04L 12/24* (2006.01)
   *H04L 12/10* (2006.01)

(56) References Cited

U.S. PATENT DOCUMENTS

| | | | |
|---|---|---|---|
| 5,173,794 A | 12/1992 | Cheung et al. | |
| 5,442,629 A | 8/1995 | Geyer et al. | |
| 5,539,727 A | 7/1996 | Kramarczyk et al. | |
| 5,550,802 A | 8/1996 | Worsley et al. | |
| 5,550,803 A | 8/1996 | Crayford et al. | |
| 5,648,965 A | 7/1997 | Thadani et al. | |
| 5,696,859 A | 12/1997 | Onaka et al. | |
| 5,710,846 A | 1/1998 | Wayman et al. | |
| 5,715,247 A | 2/1998 | Nara et al. | |
| 5,774,453 A | 6/1998 | Fukano et al. | |
| 5,781,318 A | 7/1998 | Tremblay | |
| 5,825,775 A | 10/1998 | Chin et al. | |
| 5,850,385 A | 12/1998 | Esaki | |
| 5,887,158 A | 3/1999 | Sample et al. | |
| 5,898,837 A | 4/1999 | Guttman et al. | |
| 5,983,308 A | 11/1999 | Kerstein | |
| 6,041,037 A | 3/2000 | Nishio et al. | |
| 6,041,307 A | 3/2000 | Ahuja et al. | |
| 6,047,321 A | 4/2000 | Raab et al. | |
| 6,108,310 A | 8/2000 | Wilkinson et al. | |
| 6,167,025 A | 12/2000 | Hsing et al. | |
| 6,181,677 B1 | 1/2001 | Valli et al. | |
| 6,239,579 B1 | 5/2001 | Dunn et al. | |
| 6,272,113 B1 | 8/2001 | McIntyre et al. | |
| 6,272,136 B1 | 8/2001 | Lin et al. | |
| 6,289,511 B1 | 9/2001 | Hübinette | |
| 6,366,557 B1 | 4/2002 | Hunter | |
| 6,381,218 B1 | 4/2002 | McIntyre et al. | |
| 6,389,550 B1 | 5/2002 | Carter | |
| 6,424,627 B1 | 7/2002 | Sorhaug et al. | |
| 6,449,247 B1 | 9/2002 | Manzardo et al. | |
| 6,530,047 B1 | 3/2003 | Edwards et al. | |
| 6,542,145 B1 | 4/2003 | Resisinger et al. | |
| 6,650,803 B1 | 11/2003 | Ramaswami et al. | |
| 6,658,565 B1 | 12/2003 | Gupta et al. | |
| 6,687,009 B2 | 2/2004 | Hui et al. | |
| 6,687,847 B1 | 2/2004 | Aguilera et al. | |
| 6,697,863 B1 | 2/2004 | Egawa et al. | |
| 6,714,976 B1 | 3/2004 | Wilson et al. | |
| 6,798,740 B1 | 9/2004 | Senevirathne et al. | |
| 6,801,840 B2 | 10/2004 | Kodama et al. | |
| 6,801,940 B1 | 10/2004 | Moran et al. | |
| 6,823,383 B2 | 11/2004 | MacBride | |
| 6,836,540 B2 | 12/2004 | Falcone et al. | |
| 6,841,985 B1 | 1/2005 | Fetzer | |
| 6,850,706 B2 | 2/2005 | Jager et al. | |
| 6,882,654 B1 | 4/2005 | Nelson | |
| 6,895,005 B1 | 5/2005 | Malin et al. | |
| 6,898,630 B2 | 5/2005 | Ueno et al. | |
| 6,898,632 B2 * | 5/2005 | Gordy et al. | 709/224 |
| 6,914,892 B1 | 7/2005 | Cooper et al. | |
| 6,925,052 B1 | 8/2005 | Reynolds et al. | |
| 6,944,437 B2 | 9/2005 | Yang et al. | |
| 6,975,209 B2 | 12/2005 | Gromov | |
| 7,027,437 B1 | 4/2006 | Merchant et al. | |
| 7,061,942 B2 | 6/2006 | Noronha et al. | |
| 7,171,504 B2 | 1/2007 | Ishii | |
| 7,275,100 B2 | 9/2007 | Yamagami | |
| 7,277,957 B2 | 10/2007 | Rowley et al. | |
| 7,284,055 B1 | 10/2007 | Oehrke et al. | |
| 7,308,705 B2 | 12/2007 | Gordy et al. | |
| 7,321,565 B2 | 1/2008 | Todd et al. | |
| 7,324,553 B1 | 1/2008 | Varier et al. | |
| 7,362,765 B1 | 4/2008 | Chen | |
| 7,415,013 B1 | 8/2008 | Lo | |
| 7,430,354 B2 | 9/2008 | Williams | |
| 7,477,611 B2 | 1/2009 | Huff | |
| 7,486,624 B2 | 2/2009 | Shaw et al. | |
| 7,486,625 B2 | 2/2009 | Matityahu et al. | |
| 7,499,412 B2 | 3/2009 | Matityahu et al. | |
| 7,505,416 B2 | 3/2009 | Gordy et al. | |
| 7,522,543 B2 | 4/2009 | Matityahu et al. | |
| 7,573,896 B2 | 8/2009 | Wang et al. | |
| 7,594,095 B1 | 9/2009 | Nordquist | |
| 7,599,301 B2 | 10/2009 | Matityahu et al. | |
| 7,616,587 B1 | 11/2009 | Lo et al. | |
| 7,627,029 B2 | 12/2009 | Ho et al. | |
| 7,760,859 B2 | 7/2010 | Matityahu et al. | |
| 7,773,529 B2 | 8/2010 | Matityahu | |
| 7,788,365 B1 | 8/2010 | Foster et al. | |
| 7,809,960 B2 | 10/2010 | Cicchetti et al. | |
| 7,813,263 B2 | 10/2010 | Chang et al. | |
| 7,822,340 B2 | 10/2010 | Matityahu et al. | |
| 7,835,265 B2 | 11/2010 | Wang et al. | |
| 7,898,984 B2 | 3/2011 | Matityahu et al. | |
| 7,903,576 B2 | 3/2011 | Matityahu et al. | |
| 7,953,839 B2 | 5/2011 | Sim et al. | |
| 8,018,856 B2 | 9/2011 | Matityahu et al. | |
| 8,077,049 B2 * | 12/2011 | Yaney et al. | 340/660 |
| 8,094,576 B2 | 1/2012 | Matityahu et al. | |
| 8,320,242 B2 | 11/2012 | Matityahu et al. | |
| 8,325,716 B2 | 12/2012 | Ni | |
| 8,369,218 B2 | 2/2013 | Matityahu et al. | |
| 8,432,827 B2 | 4/2013 | Matityahu et al. | |
| 8,582,472 B2 | 11/2013 | Matityahu et al. | |
| 8,654,932 B2 | 2/2014 | Matityahu et al. | |
| 8,737,197 B2 | 5/2014 | Matityahu et al. | |
| 8,755,293 B2 | 6/2014 | Matityahu et al. | |
| 8,902,735 B2 | 12/2014 | Matityahu et al. | |
| 9,019,863 B2 | 4/2015 | Matityahu et al. | |
| 9,306,959 B2 | 4/2016 | Matityahu et al. | |
| 2001/0040870 A1 | 11/2001 | Ohmori et al. | |
| 2002/0003592 A1 | 1/2002 | Hett et al. | |
| 2002/0023184 A1 | 2/2002 | Paul | |
| 2002/0026374 A1 | 2/2002 | Moneymaker et al. | |
| 2002/0032880 A1 | 3/2002 | Poletto et al. | |
| 2002/0061027 A1 | 5/2002 | Abiru et al. | |
| 2002/0073199 A1 | 6/2002 | Levine et al. | |
| 2002/0078178 A1 | 6/2002 | Senoh | |
| 2002/0087710 A1 | 7/2002 | Aiken et al. | |
| 2002/0110148 A1 | 8/2002 | Hickman et al. | |
| 2002/0146016 A1 | 10/2002 | Liu et al. | |
| 2002/0176355 A1 | 11/2002 | Mimms et al. | |
| 2002/0180592 A1 | 12/2002 | Gromov | |
| 2002/0197004 A1 * | 12/2002 | Feinberg et al. | 385/24 |
| 2003/0033406 A1 | 2/2003 | John et al. | |
| 2003/0061340 A1 | 3/2003 | Sun et al. | |
| 2003/0090995 A1 * | 5/2003 | Illikkal et al. | 370/222 |
| 2003/0112760 A1 | 6/2003 | Puppa et al. | |
| 2003/0142666 A1 | 7/2003 | Bonney et al. | |
| 2003/0145039 A1 | 7/2003 | Bonney et al. | |
| 2003/0147385 A1 | 8/2003 | Montalvo et al. | |
| 2003/0184386 A1 | 10/2003 | Varner et al. | |
| 2003/0215236 A1 | 11/2003 | Manifold | |
| 2004/0008675 A1 | 1/2004 | Basso et al. | |
| 2004/0023651 A1 | 2/2004 | Gollnick et al. | |
| 2004/0046516 A1 * | 3/2004 | Uekawa | 318/98 |
| 2004/0062556 A1 | 4/2004 | Kubo et al. | |
| 2004/0085893 A1 | 5/2004 | Wang et al. | |
| 2004/0090934 A1 | 5/2004 | Cha et al. | |
| 2004/0096227 A1 | 5/2004 | Bulow | |
| 2004/0109411 A1 | 6/2004 | Martin | |
| 2004/0120259 A1 | 6/2004 | Jones et al. | |
| 2004/0128380 A1 | 7/2004 | Chen et al. | |
| 2004/0190547 A1 | 9/2004 | Gordy et al. | |
| 2004/0202164 A1 | 10/2004 | Hooper et al. | |
| 2004/0215832 A1 | 10/2004 | Gordy et al. | |
| 2004/0236866 A1 | 11/2004 | Dugatkin et al. | |
| 2004/0243702 A1 | 12/2004 | Vainio et al. | |
| 2004/0264494 A1 | 12/2004 | Kim | |
| 2005/0005031 A1 | 1/2005 | Gordy et al. | |
| 2005/0018618 A1 | 1/2005 | Mualem et al. | |
| 2005/0050205 A1 | 3/2005 | Gordy et al. | |
| 2005/0060535 A1 | 3/2005 | Bartas | |

(56) References Cited

U.S. PATENT DOCUMENTS

| | | |
|---|---|---|
| 2005/0071711 A1 | 3/2005 | Shaw |
| 2005/0108444 A1 | 5/2005 | Flauaus et al. |
| 2005/0122910 A1 | 6/2005 | Parupudi et al. |
| 2005/0129033 A1 | 6/2005 | Gordy et al. |
| 2005/0132051 A1 | 6/2005 | Hill et al. |
| 2005/0213512 A1 | 9/2005 | Konuma et al. |
| 2005/0231367 A1 | 10/2005 | Bellantoni |
| 2005/0257262 A1 | 11/2005 | Matityahu et al. |
| 2005/0271065 A1 | 12/2005 | Gallatin et al. |
| 2005/0278565 A1 | 12/2005 | Frattura et al. |
| 2006/0002292 A1 | 1/2006 | Chang et al. |
| 2006/0083268 A1 | 4/2006 | Holaday et al. |
| 2006/0083511 A1 | 4/2006 | Edmunds et al. |
| 2006/0106929 A1 | 5/2006 | Kenoyer et al. |
| 2006/0153092 A1 | 7/2006 | Matityahu et al. |
| 2006/0200711 A1 | 9/2006 | Schondelmayer et al. |
| 2006/0215566 A1 | 9/2006 | Walsh |
| 2006/0233115 A1 | 10/2006 | Matityahu et al. |
| 2006/0282529 A1 | 12/2006 | Nordin |
| 2007/0002754 A1 | 1/2007 | Matityahu et al. |
| 2007/0002755 A1 | 1/2007 | Matityahu et al. |
| 2007/0002769 A1 | 1/2007 | Matityahu et al. |
| 2007/0064917 A1 | 3/2007 | Matityahu et al. |
| 2007/0081549 A1* | 4/2007 | Cicchetti et al. ............. 370/447 |
| 2007/0081553 A1 | 4/2007 | Cicchetti et al. |
| 2007/0121499 A1 | 5/2007 | Pal et al. |
| 2007/0140398 A1 | 6/2007 | Inoue et al. |
| 2007/0171908 A1 | 7/2007 | Tillman et al. |
| 2007/0171966 A1 | 7/2007 | Light et al. |
| 2007/0174492 A1 | 7/2007 | Light et al. |
| 2007/0189171 A1 | 8/2007 | Abrahams |
| 2007/0211682 A1 | 9/2007 | Kim et al. |
| 2007/0213862 A1 | 9/2007 | Chang et al. |
| 2007/0218874 A1 | 9/2007 | Sinha et al. |
| 2007/0253329 A1 | 11/2007 | Rooholamini et al. |
| 2007/0297342 A1 | 12/2007 | Yasuta |
| 2008/0013467 A1 | 1/2008 | Light et al. |
| 2008/0014879 A1 | 1/2008 | Light et al. |
| 2008/0049627 A1 | 2/2008 | Nordin |
| 2008/0072291 A1 | 3/2008 | Carley |
| 2008/0144613 A1 | 6/2008 | Adhikari et al. |
| 2008/0168283 A1 | 7/2008 | Penning |
| 2008/0198742 A1 | 8/2008 | Kaempfer |
| 2008/0214108 A1 | 9/2008 | Beigne et al. |
| 2008/0296685 A1* | 12/2008 | Sonehara et al. ............. 257/355 |
| 2009/0040932 A1 | 2/2009 | Matityahu et al. |
| 2009/0041051 A1 | 2/2009 | Matityahu et al. |
| 2009/0168659 A1 | 7/2009 | Matityahu et al. |
| 2009/0178144 A1 | 7/2009 | Redlich et al. |
| 2009/0210649 A1 | 8/2009 | Wan et al. |
| 2009/0219808 A1 | 9/2009 | Ogura |
| 2009/0245128 A1 | 10/2009 | Matityahu et al. |
| 2009/0279541 A1 | 11/2009 | Wong et al. |
| 2009/0303883 A1 | 12/2009 | Kucharczyk et al. |
| 2010/0014605 A1 | 1/2010 | Geile et al. |
| 2010/0135313 A1 | 6/2010 | Davis et al. |
| 2010/0146113 A1 | 6/2010 | Matityahu et al. |
| 2010/0167713 A1 | 7/2010 | Hoffman |
| 2010/0183298 A1 | 7/2010 | Biegert et al. |
| 2010/0195538 A1 | 8/2010 | Merkey et al. |
| 2010/0247068 A1 | 9/2010 | Howarter et al. |
| 2010/0254310 A1 | 10/2010 | Kats et al. |
| 2010/0278052 A1 | 11/2010 | Matityahu et al. |
| 2011/0149801 A1 | 6/2011 | Matityahu et al. |
| 2011/0161544 A1 | 6/2011 | Chengson et al. |
| 2011/0164521 A1 | 7/2011 | Matityahu et al. |
| 2011/0211446 A1 | 9/2011 | Matityahu et al. |
| 2011/0211473 A1 | 9/2011 | Matityahu et al. |
| 2012/0002552 A1 | 1/2012 | Matityahu et al. |
| 2012/0176917 A1 | 7/2012 | Matityahu et al. |

FOREIGN PATENT DOCUMENTS

| | | |
|---|---|---|
| JP | 2001-197066 A | 7/2001 |
| JP | 2006-148686 A | 6/2006 |
| KR | 10-2004-0058415 A | 7/2004 |
| TW | I508491 B | 11/2015 |
| WO | WO 01/63838 A2 | 8/2001 |
| WO | WO 02/19642 A1 | 3/2002 |
| WO | WO 2004/012163 A2 | 2/2004 |
| WO | WO-2005/043838 A1 | 5/2005 |
| WO | WO 2009/021122 A2 | 2/2009 |

OTHER PUBLICATIONS

Non-Final Office Action for U.S. Appl. No. 13/034,730 (dated Mar. 13, 2014).
Notice of Allowance for U.S. Appl. No. 13/070,086 (dated Feb. 4, 2014).
Advisory Action for U.S. Appl. No. 13/034,730 (dated Sep. 12, 2013).
Final Office Action for U.S. Appl. No. 13/070,086 (dated Aug. 9, 2013).
Final Office Action for U.S. Appl. No. 13/034,730 (dated Jun. 5, 2013).
Non-Final Office Action for U.S. Appl. No. 13/070,086 (dated Jan. 25, 2013).
Non-Final Office Action for U.S. Appl. No. 13/034,730 (dated Dec. 6, 2012).
"International Search Report", PCT Application No. PCT/US2012/030448, dated Oct. 19, 2012. (Dated Oct. 19, 2012).
"Written Opinion", PCT Application No. PCT/US2012/030448, dated Oct. 19, 2012. (Dated Oct. 19, 2012).
Notice of Allowance for U.S. Appl. No. 10/834,448 (dated Oct. 4, 2012).
"International Preliminary Report on Patentability", PCT Application No. PCT/US2011/026159, dated Sep. 13, 2012. (Dated Sep. 13, 2012).
"International Search Report", PCT Application No. PCT/US2011/026159, dated Nov. 30, 2011. (Dated Nov. 30, 2011).
"Written Opinion", PCT Application No. PCT/US2011/026159, dated Nov. 30, 2011. (Dated Nov. 30, 2011).
"Final Office Action", U.S. Appl. No. 10/834,448, dated Jun. 27, 2011. (Dated Jun. 27, 2011).
"Non Final Office Action", U.S. Appl. No. 10/834,448, dated Dec. 22, 2010 (dated Dec. 22, 2010).
Advisory Action for U.S. Appl. No. 10/834,448 (dated Sep. 23, 2010).
"Final Office Action", U.S. Appl. No. 10/834,448, dated Aug. 3, 2010. (Dated Aug. 3, 2010).
"Non Final Office Action", U.S. Appl. No. 10/834,448, dated Feb. 18, 2010. (Dated Feb. 18, 2010).
"Final Office Action", U.S. Appl. No. 10/834,448, dated Dec. 9, 2009. (Dated Dec. 9, 2009).
"Non-Final Office Action", U.S. Appl. No. 10/834,448, dated Mar. 4, 2009. (Dated Mar. 4, 2009).
Belkin International, Inc., "Belkin Quick Installation Guide", N1 Vision Wireless Router, Belkin International, Inc., Compton, CA, Feb. 11, 2009, 3 pages total. (Feb. 11, 2009).
"Non Final Office Action", U.S. Appl. No. 10/834,448, dated Feb. 7, 2008. (Dated Feb. 7, 2008).
Gigamon Systems LLC, "GigaVUE—Product Brief", Gigamon Systems LLC, http://web.archive.org/web/20070815021951/www.gigamon.com/pdf/GigamonSystems-OnePageProductBrief.pdf Aug. 15, 2007, 1 page. (Aug. 15, 2007).
Hp, et al., "Reduced Gigabit Media Independent Interface (RGMII)", Nov. 30, 2005, http://web.archive.org/web/20051113015000/http://www.hp.com/rnd/pdfs/RGMIIv2_0_final_hp. Pdf. (Nov. 30, 2005).
Wikipedia, "Field-programmable Gate Array", Jan. 21, 2005, http://web.archive.org/web/20050121193052/http://en.wikipedia.org/wiki/Field-programmable_gate_array. (Jan. 21, 2005).
Xilinx, "LogiCore OPB Ethernet Life Media Access Controller", v1.01b (Mar. 3, 2006).
"Fast Ethernet Fiber-to-Fiber Converters", Canary Communications, Inc., 7 pages total (2004).
"Sequence Reducer/Sequence Mirror Operator's Guide", Peribit Networks, Inc. 13 pages total (2001-2005).

(56) References Cited

OTHER PUBLICATIONS

"PeriScope Central Management System (CMS) 5.0 Administrator's Guide", Peribit Networks, Inc. 13 pages total (2003-2004).
"VSS Coppertap Literature", VSS Monitoring Inc. 2 pages. (2003-2004).
"VSS Easy Install Guide", VSS Monitoring Inc. 8 pages total. (2003 2005).
"VSS Linksafe", VSS Monitoring Inc., 1 page. (2003-2005).
Anonymous, "100Base-TX/100BBase-FX Media Converters E-100BTX-FX-04 User's Guide". Transitions Networks, Minneapolis. MN. Copyright 1998-2000, 4 pages. (1998-2000).
Extended European Search Report for European Patent Application No. 11748109.3 (dated Jul. 20, 2016).
Belkin International, Inc., "Network Status Display", Belkin International Inc., Compton, CA, 2007, 1 page total. (2007).
"Fast Ethernet Fiber-to-Fiber Converters", Canary Communications, Inc., 7 pages total, 2004.
"Quick Installation Guide—N1 Vision Wireless Modem Router," Network Status Display, 2008 Belkin International, Inc. (2008).
10/100/1000 Bypass Switch Implementation, 2 Pages (Oct. 17, 2007).
Advisory Action for U.S. Appl. No. 11/174,033 (dated Feb. 26, 2009).
Advisory Action for U.S. Appl. No. 11/174,033 (dated Jun. 13, 2012).
Advisory Action for U.S. Appl. No. 11/835,233 (dated Jan. 13, 2010).
Advisory Action for U.S. Appl. No. 12/481,847 (dated Feb. 25, 2011).
Advisory Action for U.S. Appl. No. 12/839,373 (dated Jan. 25, 2013).
Applicant-Initiated Interview Summary for U.S. Appl. No. 13/346,651 (dated Jun. 20, 2016).
Applicant-Initiated Inteview Summary for U.S. Appl. No. 13/944,795 (dated Aug. 18, 2016).
Communication of European Search Report for European Patent Application No. 10786787.1 (dated Jun. 16, 2016).
Communication of the extended European search report for European Patent Application No. 11748111.9 (dated Aug. 24, 2016).
Communication pursuant to Article 94(3) EPC for European Patent Application No. 08 171 759.7 (Jun. 8, 2012).
Communication pursuant to Article 94(3) EPC for European Patent Application No. 12 760 718.2 (dated Jan. 17, 2017).
European Search Report for European Patent Application No. 08 171759 (dated Jul. 31, 2009).
Extended European Search Report for European Patent Application No. 06785879.5, dated Nov. 25, 2011.
Final Office Action for U.S. Appl. No. 13/034,732 (dated Oct. 2, 2013).
Final Office Action for U.S. Appl. No. 13/034,733 (dated Sep. 10, 2013).
Final Office Action for U.S. Appl. No. 13/034,736 (dated Jul. 11, 2013).
Final Office Action for U.S. Appl. No. 13/346,651 (dated Sep. 9, 2014).
Final Office Action for U.S. Appl. No. 11/174,033 (dated Dec. 10, 2008).
Final Office Action for U.S. Appl. No. 11/174,033 (dated Jun. 24, 2010).
Final Office Action for U.S. Appl. No. 11/174,033 (dated Jan. 5, 2012).
Final Office Action for U.S. Appl. No. 11/174,033 (dated Mar. 27, 2012).
Final Office Action for U.S. Appl. No. 11/835,233 (dated Oct. 30, 2009).
Final Office Action for U.S. Appl. No. 12/839,373 (dated Nov. 15, 2012).
Final Office Action for U.S. Appl. No. 13/944,795 (dated Jun. 16, 2016).
Final Office Action for U.S. Appl. No. 12/481,847, dated Feb. 9, 2011.
Inter Partes Reexamination Office Action for U.S. Appl. No. 95/001,318, Patent in Re-examination No. 7,486,625 (dated Apr. 23, 2010).
International Preliminary Report on Patentability for International Application No. PCT/US2006/025437 (dated Jan. 17, 2008).
International Preliminary Report on Patentability for International Application No. PCT/US2008/072484 (dated Feb. 18, 2010).
International Preliminary Report on Patentability for International Application No. PCT/US2008/072493 (dated Feb. 18, 2010).
International Preliminary Report on Patentability, PCT Application No. PCT/US2010/037985, dated Dec. 22, 2011.
International Preliminary Report on Patentability, PCT Application No. PCT/US2008/080598; dated Aug. 24, 2011.
International Preliminary Report on Patentability, PCT Application No. PCT/US2011/026160, dated Sep. 7, 2012.
International Preliminary Report on Patentability, PCT Application No. PCT/US2011/026162, dated Sep. 7, 2012.
International Preliminary Report on Patentability, PCT Application No. PCT/US2011/026165, dated Sep. 7, 2012.
International Search Report and the Written Opinion of the International Searching Authority, or the Declaration for International Application No. PCT/US2010/037985 (dated Dec. 31, 2010).
Kuboniwa, Akiko, et al. "IPsec-GW redundancy method with high reliability." Information and Telecommunication Technologies (APSITT), 2010 8th Asia-Pacific Symposium on. (pp. 1-5). IEEE, 2010.
Liang, Chieh-Jan Mike, et al. "Racnet: a high-fidelity data center sensing network," Proceedings of the 7th ACM Conference on Embedded Networked Sensor Systems. (pp. 15-28). ACM, 2009.
Non-Final Office Action for U.S. Appl. No. 13/034,732 (dated Feb. 14, 2013).
Non-Final Office Action for U.S. Appl. No. 13/034,733 (dated Feb. 28, 2013).
Non-Final Office Action for U.S. Appl. No. 13/034,733 (dated Apr. 9, 2014).
Non-Final Office Action for U.S. Appl. No. 13/034,736 (dated Dec. 19, 2012).
Non-Final Office Action for U.S. Appl. No. 13/034,736 (dated Jul. 29, 2015).
Non-Final Office Action for U.S. Appl. No. 13/346,651 (dated Feb. 21, 2014).
Non-Final Office Action for U.S. Appl. No. 10/834,448 (dated Feb. 18, 2010).
Non-Final Office Action for U.S. Appl. No. 10/834,448 (dated Dec. 22, 2010).
Non-Final Office Action for U.S. Appl. No. 11/223,477 (dated Jun. 12, 2008).
Non-Final Office Action for U.S. Appl. No. 11/174,033 (dated May 29, 2008).
Non-Final Office Action for U.S. Appl. No. 11/174,033 (dated Sep. 15, 2009).
Non-Final Office Action for U.S. Appl. No. 11/174,033 (dated Apr. 28, 2011).
Non-Final Office Action for U.S. Appl. No. 11/174,032 (dated Apr. 23, 2008).
Non-Final Office Action for U.S. Appl. No. 11/174,238 (dated Oct. 1, 2008).
Non-Final Office Action for U.S. Appl. No. 11/174,248 (dated Jun. 26, 2008).
Non-Final Office Action for U.S. Appl. No. 11/370,487 (dated Mar. 25, 2009).
Non-Final Office Action for U.S. Appl. No. 11/370,487 (dated Jun. 11, 2009).
Non-Final Office Action for U.S. Appl. No. 11/835,228 (dated Jan. 14, 2010).
Non-Final Office Action for U.S. Appl. No. 11/835,228 (dated Sep. 9, 2010).
Non-Final Office Action for U.S. Appl. No. 11/835,233 (dated Jun. 9, 2009).
Non-Final Office Action for U.S. Appl. No. 11/835,233 (dated Jun. 25, 2010).

(56) References Cited

OTHER PUBLICATIONS

Non-Final Office Action for U.S. Appl. No. 12/714,404 (dated Apr. 2, 2012).
Non-Final Office Action for U.S. Appl. No. 12/839,373 (dated Dec. 22, 2011).
Non-Final Office Action for U.S. Appl. No. 12/839,373 (dated Jun. 7, 2012).
Non-Final Office Action for U.S. Appl. No. 12/839,373 (dated Apr. 1, 2013).
Non-Final Office Action for U.S. Appl. No. 12/705,195 (dated Dec. 27, 2010).
Non-Final Office Action for U.S. Appl. No. 12/481,847 (dated Nov. 4, 2010).
Non-Final Office Action for U.S. Appl. No. 13/036,842 (dated Oct. 17, 2012).
Non-Final Office Action for U.S. Appl. No. 13/036,842 (dated Feb. 12, 2013).
Non-Final Office Action for U.S. Appl. No. 13/944,795 (dated Jan. 16, 2015).
Non-Final Office Action for U.S. Appl. No. 13/230,760 (dated Oct. 4, 2012).
Non-Final Office Action for U.S. Appl. No. 13/346,651 (dated Apr. 12, 2016).
Non-Final Office Action for U.S. Appl. No. 13/944,795 (dated Sep. 9, 2016).
Notice of Allowability for U.S. Appl. No. 13/034,736 (dated Mar. 8, 2016).
Notice of Allowance and Fee(s) Due and Applicant-Initiated Interview Summary for U.S. Appl. No. 13/034,736 (dated Nov. 20, 2015).
Notice of Allowance and Fee(s) Due and Examiner Initiated Interview Summary for U.S. Appl. No. 13/042,135 (dated Dec. 31, 2012).
Notice of Allowance and Fee(s) Due and examiner initiated interview summary for U.S. Appl. No. 11/965,668 (dated Oct. 8, 2009).
Notice of Allowance and Fee(s) Due for U.S. Appl. No. 13/230,760 (dated Mar. 21, 2013).
Notice of Allowance and Fee(s) Due for U.S. Appl. No. 13/036,842 (dated Jun. 10, 2013).
Notice of Allowance and Fee(s) Due for U.S. Appl. No. 13/034,732 (dated Jan. 17, 2014).
Notice of Allowance and Fee(s) Due for U.S. Appl. No. 13/034,733 (dated Dec. 24, 2014).
Supplemental Notice of Allowability for U.S. Appl. No. 13/034,733 (dated Feb. 17, 2015).
Notice of Allowance and Fee(s) Due for U.S. Appl. No. 13/346,651 (dated Oct. 7, 2016).
Notice of Allowance and Fee(s) Due in U.S. Appl. No. 11/965,668 (dated Mar. 10, 2010).
Notice of Allowance and Fee(s) Due in U.S. Appl. No. 12/705,195 (dated May 4, 2011).
Notice of Allowance and Fee(s) Due in U.S. Appl. No. 12/481,847 (dated Aug. 24, 2011).
Notice of Allowance and Fees Due and Examiner Initiated Interview Summary for U.S. Appl. No. 11/174,033 (dated Jul. 20, 2012).
Notice of Allowance and Fees Due and Examiner Initiated Interview Summary for U.S. Appl. No. 11/835,233 (dated Oct. 21, 2010).
Notice of Allowance and Fees Due for U.S. Appl. No. 11/223,477 (dated Dec. 17, 2008).
Notice of Allowance and Fees Due for U.S. Appl. No. 11/174,032 (dated Sep. 29, 2008).
Notice of Allowance and Fees Due for U.S. Appl. No. 11/174,238 (dated May 15, 2009).
Notice of Allowance and Fees Due for U.S. Appl. No. 11/174,248 (dated Oct. 20, 2008).
Notice of Allowance and Fees Due for U.S. Appl. No. 11/370,487 (dated Oct. 1, 2009).
Notice of Allowance and Fees Due for U.S. Appl. No. 11/370,487 (dated Nov. 10, 2009).
Notice of Allowance and Fees Due for U.S. Appl. No. 11/370,487 (dated Mar. 10, 2010).
Supplemental Notice of Allowability for U.S. Appl. No. 11/370,487 (dated Mar. 26, 2010).
Notice of Allowance and Fees Due for U.S. Appl. No. 12/839,373 (dated Sep. 24, 2013).
Notice of Allowance and Fees Due for U.S. Appl. No. 11/835,228 (dated Oct. 20, 2010).
Supplemental Notice of Allowability for U.S. Appl. No. 11/925,626 (dated Jun. 30, 2010).
Notice of Acceptance for Australian Application No. 2010258799 (dated Mar. 1, 2016).
Notification of Transmittal of the International Preliminary Report on Patentability for International Patent Application No. PCT/US2006/25436 (dated May 22, 2008).
Notification of Transmittal of the International Search Report and the Written Opinion of the International Searching Authority, or the Declaration for International Application No. PCT/US2006/25436 (dated Mar. 4, 2008).
Notification of Transmittal of the International Search Report and the Written Opinion of the International Searching Authority, or the Declaration for International Application No. PCT/US2006/25437 (dated Dec. 6, 2006).
Notification of Transmittal of the International Search Report and the Written Opinion of the International Searching Authority, or the Declaration for International Application No. PCT/US2008/072484 (dated Feb. 13, 2009).
Notification of Transmittal of the International Search Report and the Written Opinion of the International Searching Authority, or the Declaration for International Application No. PCT/US2008/072493 (dated Feb. 13, 2009).
Notification of Transmittal of the International Search Report and the Written Opinion of the International Searching Authority, or the Declaration for International Application No. PCT/US2008/080598 (dated May 26, 2009).
Notification of Transmittal of the International Search Report and the Written Opinion of the International Searching Authority, or the Declaration for International Application No. PCT/US2011/026160 (dated Nov. 24, 2011).
Notification of Transmittal of the International Search Report and the Written Opinion of the International Searching Authority, or the Declaration for International Application No. PCT/US2011/026162 (dated Nov. 30, 2011).
Notification of Transmittal of the International Search Report and the Written Opinion of the International Searching Authority, or the Declaration for International Application No. PCT/US2011/026165 (dated Nov. 30, 2011).
Notification of Transmittal of the International Search Report and the Written Opinion of the International Searching Authority, or the Declaration for International Application No. PCT/US2011/026158 (dated Nov. 30, 2011).
Replacement Statement and Explanation under 37 CFR § 1.915 in Support of Request for Inter Partes Reexamination of U.S. Pat. No. 7,486,625, Sonnenschein Nath & Rosenthal LLP (dated Jan. 22, 2010) 251 pages.
Request for Inter Partes Reexamination of U.S. Pat. No. 7,486,625, Sonnenschein Nath & Rosenthal LLP (dated Dec. 18, 2009), 69 pages.
Restriction Requirement for U.S. Appl. No. 11/174,033 (dated May 27, 2009).
Result of Consultation for European Patent Application No. 08 171 759.7 (dated Feb. 20, 2017).

* cited by examiner

ARRANGEMENTS AND METHODS FOR MINIMIZING DELAY IN HIGH-SPEED TAPS

PRIORITY CLAIM

The present application is a continuation-in-part and claims priority from the following applications "GIGABITS ZERO-DELAY TAP AND METHODS THEREOF", application Ser. No. 13/034,730, filed by Matityahu et al. on Feb. 25, 2011, which claims priority under 35 U.S.C. 119(e) to a commonly owned provisionally filed patent application entitled "Gigabits Zero-Delay Tap and Methods Thereof." U.S. Application No. 61/308,981, filed on Feb. 28, 2010, by inventors Matityahu et al., all of which is incorporated herein by reference.

BACKGROUND OF THE INVENTION

In today modern society, telecommunication networks play a major role in providing global data and voice communication. Monitoring a network has become important to ensure reliable operation, fault detection, timely mitigation of potentially malicious activities and more. To ensure the vitality of the company, many companies have employed network taps in order to monitor the data traffic flowing through their networks.

To facilitate discussion, FIG. 1 shows a simple diagram of a network environment with a 10/100 megabytes tap. In a typical network environment, data traffic may be flowing between two network devices (Network A and Network B). In an example, data traffic may flow from a port 102 of Network A to a port 104 of Network B. Both port 102 and port 104 may be RJ45 jacks that support Ethernet-over-twisted pairs.

In a 10/100 megabytes network environment, the direction of the data traffic is usually known and uni-directional. In an example, twisted pair pins 1-2 of port 102 and twisted pair pins 1'-2' of port 104 may be designated as the transmitting pairs while twisted pair pins 3-6 of port 102 and twisted pair pins 3'-6' of port 104 may be designated as the receiving pairs. For example, data traffic may flow from twisted pair pins 1-2 of port 102 along paths 108/110 to twisted pair pins 3'-6' of port 104. Similarly, data traffic coming in from port 104 may flow from twisted pair pins 1'-2' along paths 112/114 to twisted pair pins 3-6.

Since the directional flow of the data traffic within the network environment is known, a network tap 116 may be configured to tap into the paths (108/110 and 112/114) to monitor the data traffic flowing between the two network devices. In an example, data traffic flowing from port 102 to port 104 may be copied and sent along paths 120/122 to a set of physical layer interfaces (PHYs) 118 of network tap 116 before being forwarded to a monitoring device 128. Given that the flow of data traffic is predictable, network tap 116 may be a passive tap. In other words, network tap 116 is not required to be an inline tap. Accordingly, power loss to network tap 116 has substantially little impact on the data traffic (zero delay). In an example, latency and/or data loss may be substantially minimal. Discussion about zero delay on 10/100 megabytes tap is provided in a related application entitled "Zero-Interrupt Network Tap," filed Apr. 28, 2004 by Matityahu et al. (application Ser. No. 10/834,448), all of which are incorporated herein by reference.

However, in a faster Ethernet environment, such as a gigabit Ethernet, the direction of the data traffic is usually bidirectional and unpredictable. To facilitate discussion, FIG. 2 shows a simple diagram of a network environment with a gigabit tap. Consider the situation wherein, for example, data traffic is flowing between a port 202 of Network A to a port 204 of Network B. Both port 202 and port 204 may be RJ45 jacks that support Ethernet over twisted pairs. To establish a communication link between the two ports, auto-negotiation may be performed. In auto-negotiation, the communication link may be established based on the fastest transmission mode available for the two network devices (such as Network A and Network B) based on common transmission parameters, such as speed of the link and configuration mode (e.g., half-duplex, full-duplex, and the like). Once a communication link is determined, data traffic may then be transmitted between the two network devices.

Given that the direction of the data traffic within a fast Ethernet environment may be unpredictable, an inline tap arrangement may be employed. With an inline tap arrangement, data traffic flowing between port 202 of Network A and port 204 of Network B is configured to flow through a network tap 206. Thus, instead of a communication link established between the two network devices, a communication link may be established between network tap 206 and each of the network devices. In other words, a communication link may be established between Network A and network tap 206 and between Network B and network tap 206. In an example, a network twisted pair pins 1-2 of port 202 may be configured to send data traffic to a tap twisted pair pins 3'-6' of PHY 208. Upon receiving the data traffic, PHY 208 may then forward the data traffic onward to Network B via a tap twisted pair pins 1-2 to a network twisted pair pins 3'-6' of port 204 while a copy of the data traffic may be forwarded to a monitoring device 228.

Since the network tap is an inline device, each time the network tap experiences a power disruption (either power is turn on or off), the path between Network A and Network B may be renegotiated. In an example, network tap 206 is taken offline for maintenance. When the network tap is taken offline, a new communication link is negotiated to establish a path between Network A and Network B. In an example, a set of relays 210 may be triggered to establish a direct route from Network A to Network B (instead of going through network tap 206).

Each time network tap experiences power disruption, the communication link is lost and a new communication link may have to be established. Consider the situation wherein, for example, network tap 206 is turn off. Thus, the communication links between network tap 206 and Network A and Network B are broken. To enable data traffic to flow between the two network devices, a new communication link may be established. In other words, when the communication links are broken, a set of mechanical relays 210 may be triggered to create a new path. The time required to trigger set of mechanical relays 210 and to enable Network A and Network B to perform auto-negotiation may require a few milliseconds. The latency experienced during this time period may have dire financial consequences. In an example, in a financial industry, a latency of a few milliseconds can result in millions of dollars loss.

Accordingly, arrangements and methods for providing zero delay in a faster Ethernet environment (such as a gigabit Ethernet environment) are desirable.

BRIEF SUMMARY OF THE INVENTION

The invention relates, in an embodiment, to a monitoring device for enabling monitoring of data traversing between a first network device and a second network device through a network. The monitoring device includes a primary data path that routes the data for monitoring. The monitoring device also includes a secondary data path that routes the data in a manner that bypasses the monitoring. The monitoring device further includes a sensor for monitoring power level supplied to the monitoring device. Moreover, the monitoring device includes a relay for switching from the primary data path to the secondary data path if the power level falls below a predefined level. The monitoring device yet also includes a set of analog switches for establishing a temporary data path to ensure at least a portion of the data continues to traverse between the first network device and the second network device while the relay attempts to perform the switching.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIG. 9 shows, in an embodiment of the invention, an example of the bypass data path when no high-speed tap arrangement is powered on.

DETAILED DESCRIPTION OF EMBODIMENTS

Figure 1:
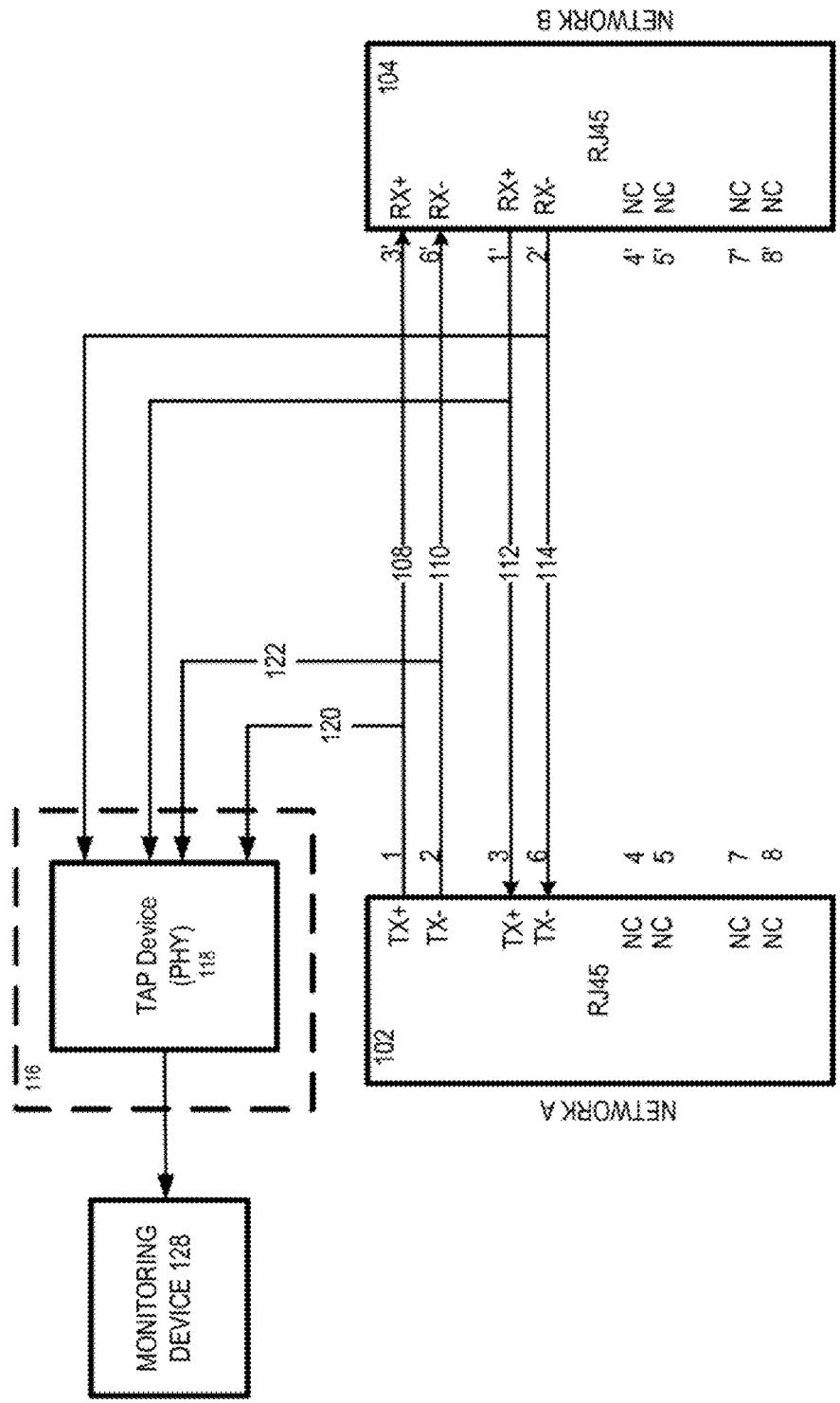
FIG. 1 shows a simple diagram of a network environment with a 10/100 megabytes tap.
Figure 2:
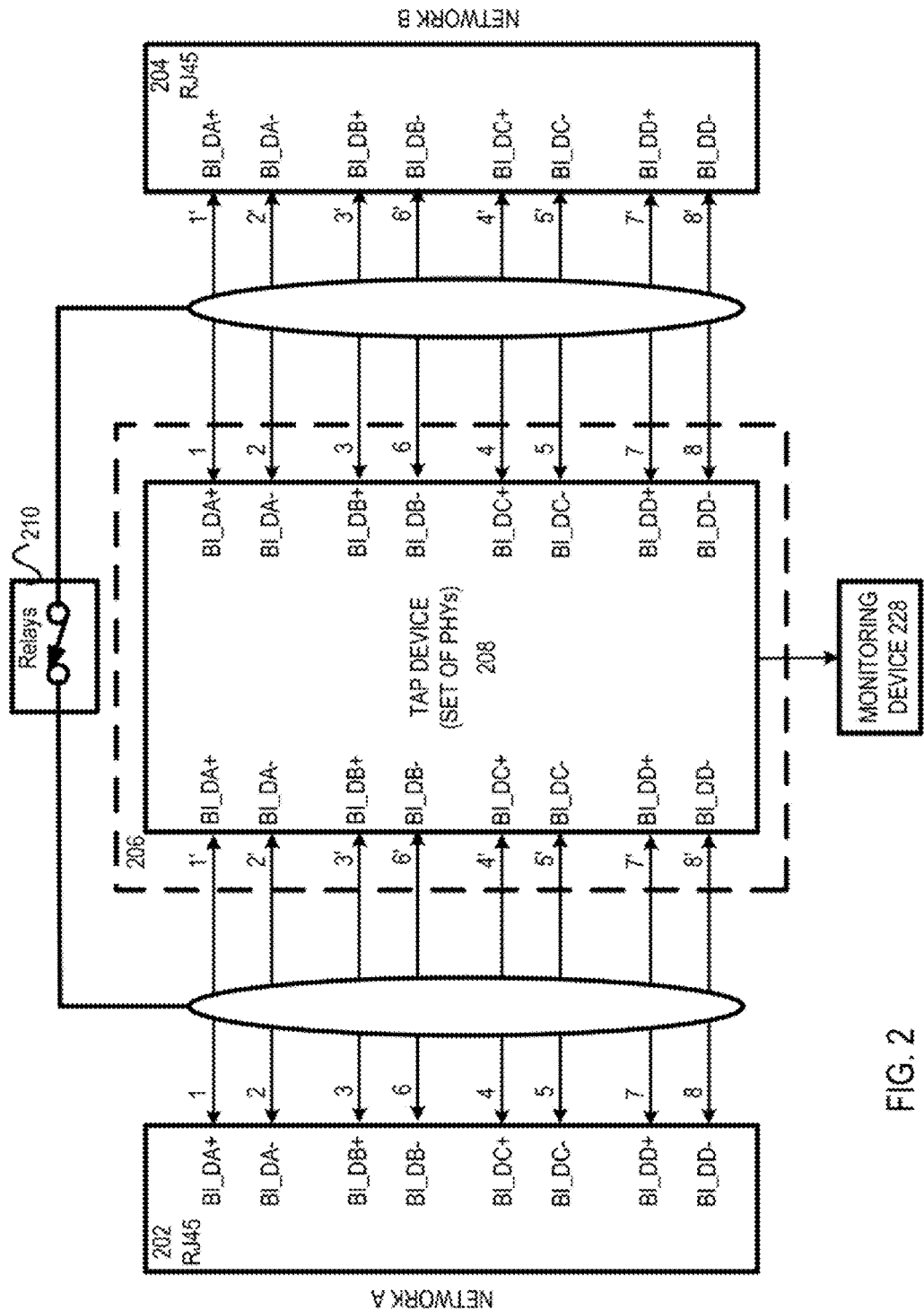
FIG. 2 shows a simple diagram of a network environment with a gigabit tap.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The invention is described with reference to specific architectures and protocols. Those skilled in the art will recognize that the description is for illustration and to provide examples of different mode of practicing the invention. The description is not meant to be limiting. For example, reference is made to network traffic and packets, while other forms of data and addresses can be used in the invention. The invention is applicable to both wire and optical technologies. The inventions also may include programmable logic for performing inline and/or span functions.

In accordance with embodiments of the present invention, a gigabits zero-delay tap is provided for enabling zero delay in a high-speed Ethernet environment (such as a gigabit Ethernet environment). Embodiments of the invention include arrangements and methods for monitoring the power supply to the gigabits zero-delay tap. Embodiments of the invention also include methods and arrangements for providing an alternative power supply to the gigabits zero-delay tap when power disruption occurs. Embodiments of the invention further include methods and arrangements for maintaining a communication link between the network devices.

In this document, various implementations may be discussed using network tap as an example. This invention, however, is not limited to network tap and may include any network and/or security appliances (e.g., routers, switches, hubs, bridges, load balancer, firewalls, packet shaper, and the like). Instead, the discussions are meant as examples and the invention is not limited by the examples presented.

As previously mentioned in a high-speed Ethernet environment, such as a gigabit Ethernet, the direction of the data traffic between network devices is usually bidirectional and unpredictable. To establish a communication link between the network devices, auto-negotiation may be performed to determine the fastest transmission mode between the network devices. Once a communication link is determined, data traffic may then be transmitted between the network devices.

A tap arrangement may be employed to control the data flow between the network devices. In other words, instead of a communication link established between the network devices, a communication link may be established between the tap and each of the network devices. However, each time the network tap experiences a power disruption, the path between the network devices may have to be renegotiated since the communication link is lost and a new communication link may have to be established. In an example, when the communication link is broken, a set of mechanical relays may be triggered to create a new path. Unfortunately, a few milliseconds may be required to trigger a set of mechanical relays and to perform auto-negotiation. These few milliseconds may create latency that may have dire financial consequences in a time sensitive environment, such as the financial industry where latency of a few milliseconds can result in millions of dollars loss.

In an embodiment of the invention, a gigabits zero-delay tap is provided. Even though the invention may be described using an inline tap example, the invention is not limited to an inline device and may include programmable logic for performing inline and/or span functions. In an embodiment, the tap may include a primary and an alternative power source. The primary source may be configured to provide the daily power source to the tap. However, when the primary power source is not working properly, an alternative power source may be triggered to prevent power disruption to the tap, thereby minimizing the possibility of latency.

In an embodiment, the gigabits zero-delay tap may include a sensor controller, which may be configured to monitor the power flowing into the tap. In an embodiment, the sensor controller may also be configured to monitor the alternative power source. In an example, if the power level for the alternative power source is low, a portion of the power flowing from the primary power source may be diverted and employed to charge the alternative power source.

In an embodiment, the sensor controller may be configured to compare the power flowing into the tap against a predefined threshold. If the power level is below a predefined threshold, then the alternative power source may be activated. In activating an alternative power source, the sensor controller may close a set of relays to create an alternative path (alternative communication link) between the network devices. Since some time may be required for the set of relays to establish the alternative path, in an embodiment of the invention, a set of capacitors may be employed to provide a temporary source of power to the network tap in order to maintain the current communication link.

Since the alternative power source is activated when the power drop is first detected and the communication link between the network devices has not yet been broken, no data packet loss is experienced. By monitoring the power level, an alternative power source may be provided to enable the data traffic to continue to flow through the network with no data packet loss. The cost of implementing an alternative power path is relatively inexpensive but may provide a company with sufficient time to perform maintenance.

If an alternative power source is not available to maintain the relationship between the network tap and the network devices, the communication link between the network devices may still be maintained such that a loss of data packets is minimized. Similar to above, a set of capacitors may be employed to provide the temporary power source to the tap to maintain the current communication link while a set of relays is establishing a direct communication path between the network devices. Even though the network tap is no longer able to monitor the data traffic flowing through the network, a communication link between the network devices is still maintained and latency is minimized. Thus, disruption to a company's network traffic may be substantially minimized, thereby, enabling the company to maintain its quality of service and limit its financial loss.

The features and advantages of the present invention may be better understood with reference to the figures and discussions that follow.

Figure 3:
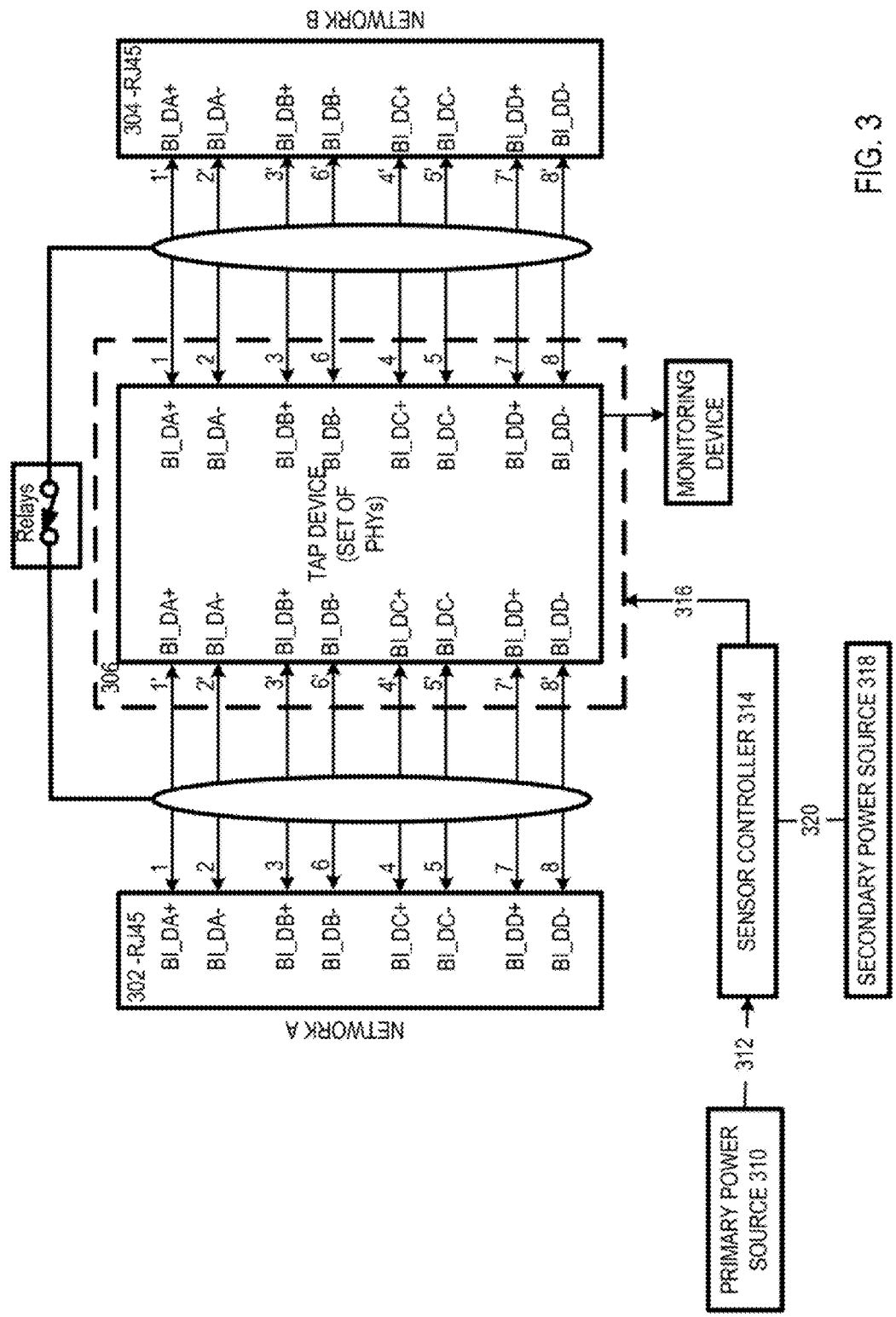
FIG. 3 shows, in an embodiment of the invention, a simple block diagram illustrating an arrangement for an alternative power source for a network tap in a fast Ethernet environment.

FIG. 3 shows, in an embodiment of the invention, a simple block diagram illustrating an arrangement for an alternative power source for a network tap in a fast Ethernet environment (high-speed). Consider the situation wherein, for example, data traffic is flowing between two network devices, between a port 302 of Network A and a port 304 of Network B. Both port 302 and port 304 may be RJ45 jacks that support Ethernet over twisted pairs. To monitor the data traffic, a gigabit network tap 306 may be provided. As aforementioned, in order for network tap 306 to monitor the data traffic, a communication link may be established between network tap 306 and port 302 of Network A and network tap 306 and port 304 of Network B.

Network tap 306 may be powered by an external power source, such as a primary power source 310 (e.g., 12 volt power adaptor). In an embodiment of the invention, a sensor controller 314 may be employed to monitor the power flowing from a path 312 into network tap 306 (via a path 316). In an embodiment, sensor controller 314 may also be configured to monitor a secondary power source 318 (such as a 12 volt battery). If the power level for secondary power source 318 is low (e.g., below a predefined threshold), sensor controller 314 may divert a portion of the power flowing from primary power source 310 to charge secondary power source 318 (via a path 320).

In an embodiment, if sensor controller 314 senses a power drop, sensor controller 314 may activate secondary power source 318. In an example, power to network tap 306 is turn off. In an embodiment, sensor controller 314 may be configured to compare power flowing from primary power source 310 against a predefined threshold. If the power coming from primary power source 310 falls below a predefined threshold, sensor controller may be configured to activate secondary power source 318 to provide an alternate source of power to network tap 306. Given that secondary power source 318 is activated when a power drop is first detected, the communication links that may be established to enable data traffic to flow through network tap 306 may be maintained.

Figure 4:
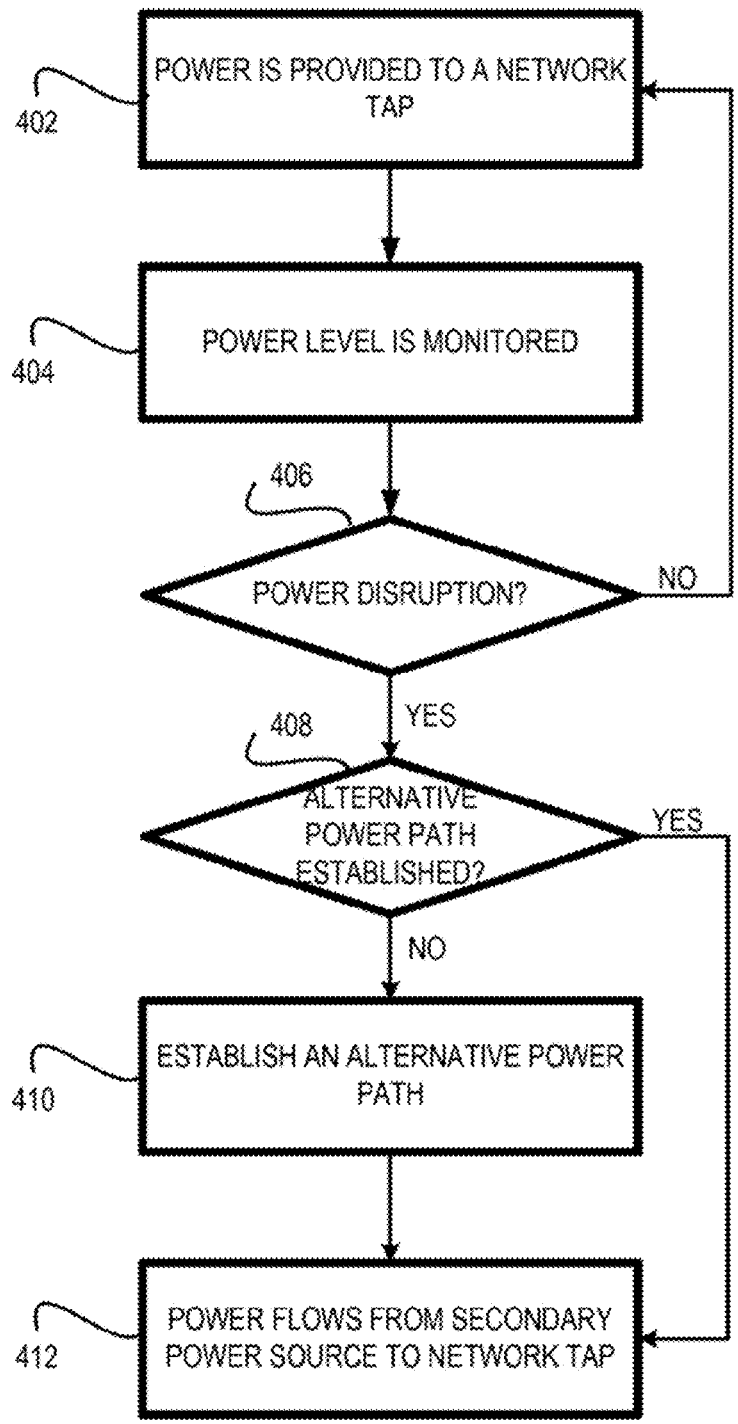
FIG. 4 shows, in an embodiment of the invention, a simple flow chart illustrating steps for implementing an alternative power source arrangement.

FIG. 4 shows, in an embodiment of the invention, a simple flow chart illustrating steps for implementing an alternative power source arrangement.

At a first step 402, power is provided to a network tap, which is configured to monitor data traffic flowing between two network devices. In an example, primary power source 310 is turned on.

At a next step 404, power level is monitored by a sensor controller. In an example, sensor controller 314 may be monitoring the power level flowing from primary power source 310 to network tap 306. In an embodiment, sensor controller 314 may also be monitoring the power level of secondary power source 318. If secondary power source 318 is low, part of power flowing from primary power source 310 is diverted to charge secondary power source 318.

At a next step 406, the sensor controller determines if a power disruption has occurred. In an example, sensor controller 314 may be comparing the power level flowing from primary power source 310 against a predefined threshold. If the power level is above the predefined threshold, power continues to flow from primary power source (step 402).

However, if the power level is below the predefined threshold, the sensor controller may then make a determination if an alternative power path has already been established (step 408). In an example, if power is currently flowing from primary power source 310, then an alternative power path is not currently established. Thus, when sensor controller 314 makes a determination that a power drop has occurred, an alternative power path may be established (step 410) and power begins to flow from secondary power source 318 (step 412). In other words, sensor controller 314 may activate secondary power source 318 to provide power to network tap 306. Thus, power is provided to network tap 306 to enable the communication links to be maintained and network tap 306 to continue monitoring the data traffic flowing through the network.

However, if an alternative power path has already been established, then power continues to flow from secondary power source 318 (step 412).

As can be appreciated from FIGS. 3 and 4, an arrangement and methods are provided for determining when power disruption may occur. By monitoring the power level, an alternative power source may be provided to enable the data traffic to continue to flow through the network with no data packet loss. The cost of implementing an alternative power path is relatively inexpensive but may provide the company sufficient time (about 4-5 hours depending upon the capability of the secondary power source) to perform maintenance and prevent data loss.

Figure 5A:
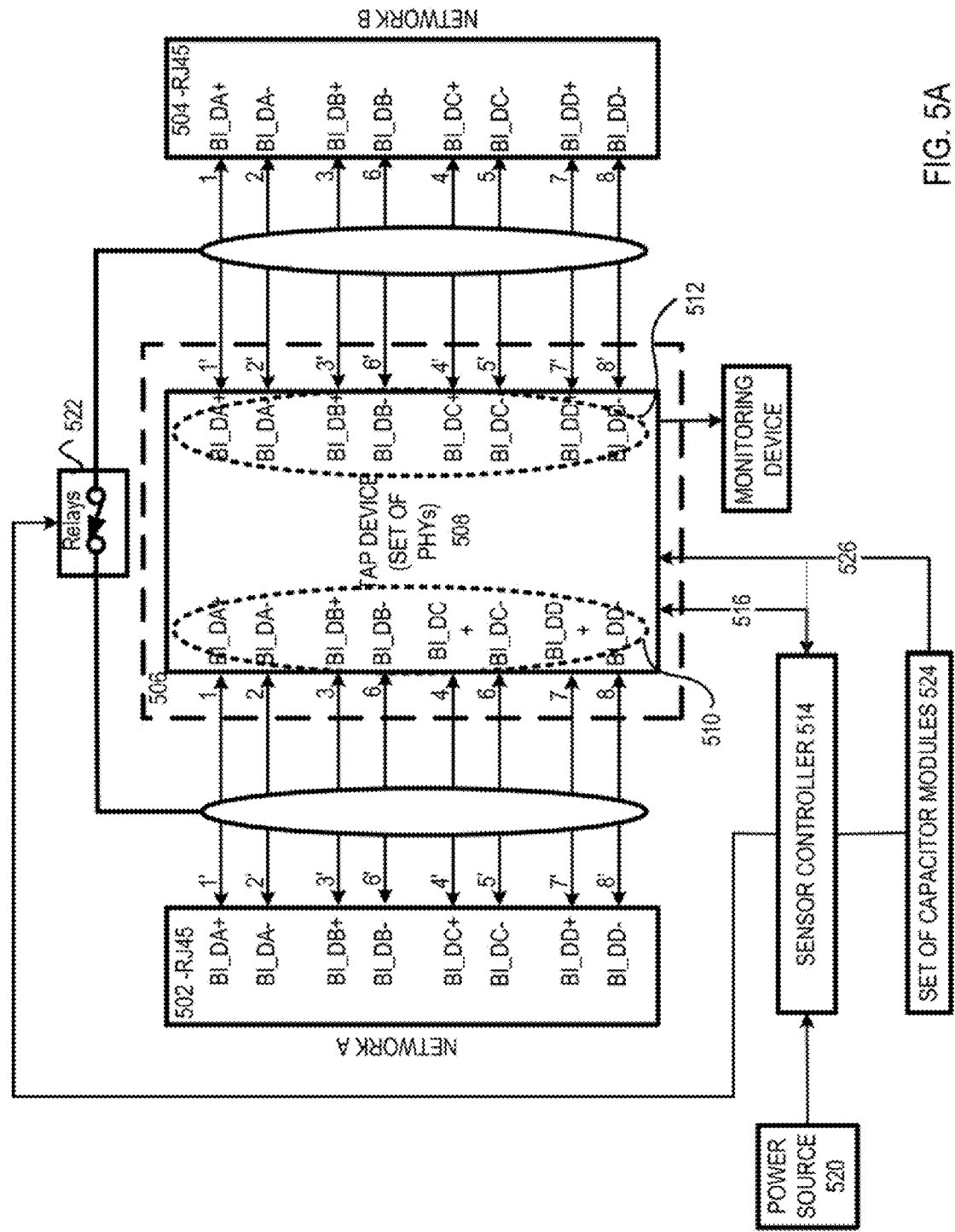
FIG. 5A shows, in an embodiment of the invention, a simple block diagram illustrating an arrangement for maintaining a link after a power disruption.

FIG. 5A shows, in an embodiment of the invention, a simple block diagram illustrating an arrangement for maintaining a link after a power disruption. Consider the situation wherein, for example, data traffic is flowing between two network devices, between a port 502 of Network A and a port 504 of Network B. Both port 502 and port 504 may be RJ45 jacks that support Ethernet over twisted pairs. To monitor the data traffic, a gigabit network tap 506 may be provided. As aforementioned, in order for network tap 506 to monitor the data traffic, a communication link may be established between network tap 506 and port 502 of Network A and network tap 506 and port 504 of Network B.

Those skilled in the art are aware that a gigabit network tap may include a set of PHYs for establishing communication links with the network devices. In an embodiment, when network tap 506 is first turn on, the master-slave mode of a set of PHYs 508 may be configured. In an embodiment, a sensor controller 514 may be employed to configure set of PHYs 508 via a path 516. In an example, side 510 of set of PHYs 508 may be set up in a master mode while side 512 of set of PHYs 508 may be set up in a slave mode. Once the master-slave mode has been established, network tap 506 may participate in auto-negotiation to establish a communication link with each of the network devices.

Since side 510 of set of PHYs has been set up in a master mode, port 502 of Network A may be set up in a slave mode. Likewise, since side 512 of set of PHYs has been set up in a slave mode, port 504 of Network B may be set up in a master mode. In an example, data traffic may flow from network twisted pair pins 1-2 of port 504 to tap twisted pair pins 3'-6' of side 512 of set of PHYs. The data traffic is then forwarded by tap twisted pair pins 1-2 of side 510 of set of PHYs 504 to network twisted pair pins 3'-6' side of port 502. In another example, data traffic may flow from network twisted pair pins 4-5 of port 504 to tap twisted pair pins 7'-8' of side 512 of set of PHYs. The data traffic is then forwarded by tap twisted pair pins 4-5 of side 510 of set of PHYs 504 to network twisted pair pins 7'-8' side of port 502.

In an embodiment, sensor controller 514 may also be configured to monitor the power level flowing to network tap 506. In an example, a primary power source 520 (such as a 12 volt power adaptor) may be available to provide power to network tap 506. Similar to FIG. 3, sensor controller 514 may be configured to compare the power level from primary power source 520 to a predefined threshold. If the power level falls below the predefined threshold, then sensor controller may switch a set of relays 522 from an opened position to a close position to create an alternative data path.

Figure 5B:
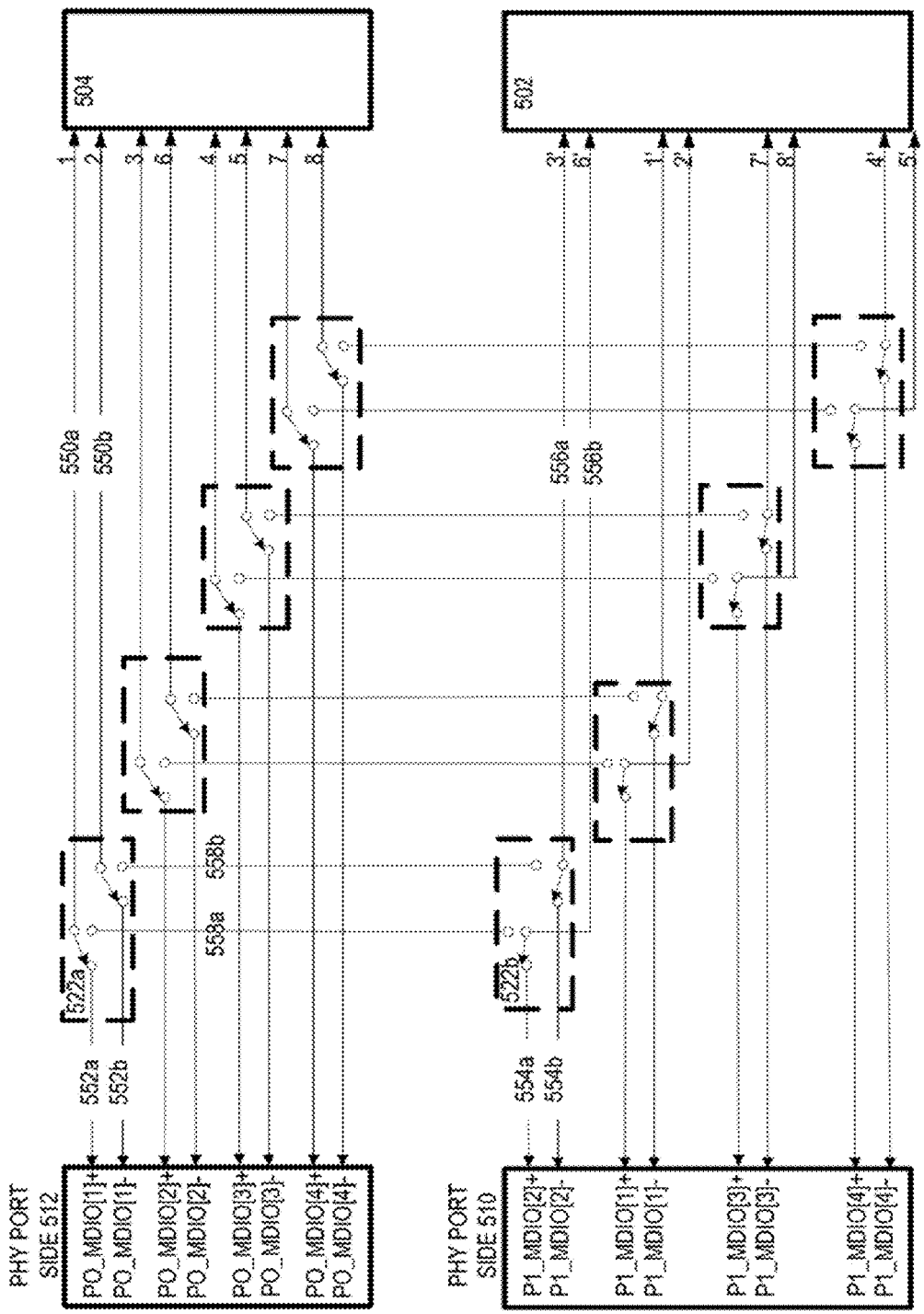
FIG. 5B shows, in an embodiment, examples of data paths between two network devices.

FIG. 5B shows, in an embodiment, examples of data paths between two network devices. In an example, data traffic may be flowing from port 504 (network twisted pair pins 1-2) through network tap 506 to port 502 (network twisted pair pins 3'-6'). In other words, data traffic may flow from network twisted pair pins 1-2 of port 504 through a relay 522a (paths 550a/550b) to tap twisted pair pins 3'-6' of side 512 of set of PHYs (paths 552a/552b). The data traffic is then forwarded by tap twisted pair pins 1-2 of side 510 of set of PHYs 504 through a relay 522b (paths 554a/554b) to network twisted pair pins 3'-6' side of port 502 (paths 556a/556b). However, when power disruption occurs, relay 522 may be switched to establish a set of alternative paths. In an example, instead of flowing through paths 552a/552b and paths 554a/554b, data traffic may be directed from relay 522a along paths 558a/558b to relay 522b (without going through network tap 506) before flowing onward to port 504 of Network B.

In an embodiment, auto-negotiation is not required to establish a new communication link. Since port 502 of Network A has been previously set up in a slave mode, for example, and port 504 of Network B has been previously set up in a master mode, for example, auto-negotiation is not required to set up a new communication link since the master-slave mode has already been defined and has not changed.

In the prior art, the set of relays may be activated to establish a new path after power has been loss. As a result, renegotiation is usually required to set up an alternative path between Network A and Network B. Unlike the prior art, the set of relays is activate by sensor controller 514 before the power disruption causes a power drop that is unable to maintain the current communication link, in an embodiment.

In other words, the set of relays may be activated before all power has been lost. By creating an alternate path prior to loss of all power, an alternative path may be established while minimizing data loss. In an embodiment, a set of capacitor modules 524 may be employed to store a power source to provide sufficient power to network tap 506 (via a path 526) to maintain the current communication links while set of relays 522 is setting up an alternative path. In an embodiment, since the master-slave mode has already been established, auto-renegotiation is not necessary to establish a new communication link between the network devices.

In an embodiment, the set of relays is a modular component and may be removable. In an example, the set of relays may be connected to a set of PHYs via a set of sockets. Thus, the set of relays may be quickly connected and disconnected for maintenance.

Figure 6A:
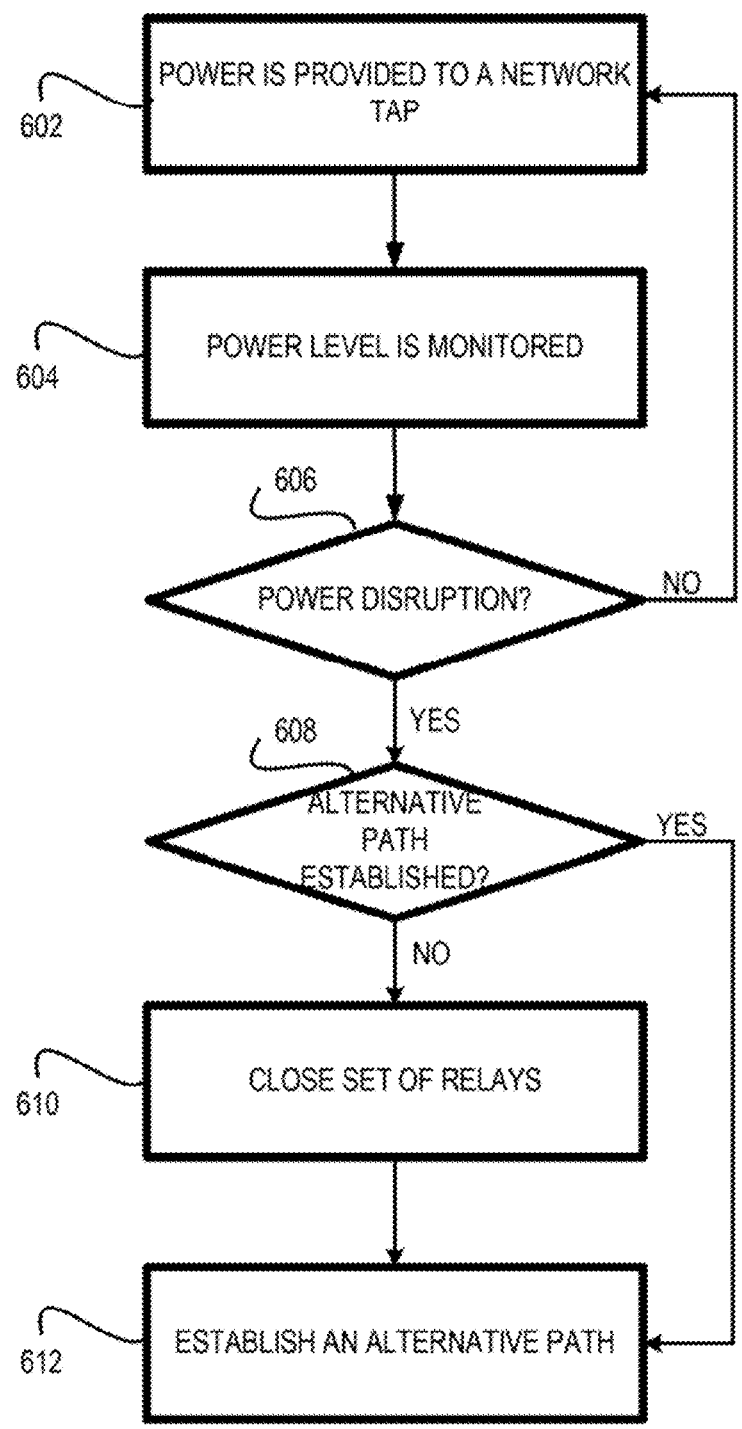
FIG. 6A shows, in an embodiment of the invention, a simple flow chart illustrating a method for maintaining a link after a power disruption in the primary power source has occurred.

FIG. 6A shows, in an embodiment of the invention, a simple flow chart illustrating a method for maintaining a link after a power disruption in the primary power source has occurred.

At a first step 602, power is provided to a network tap, which is configured to monitor data traffic flowing between two network devices. In an example, primary power source 520 is turned on.

At a next step 604, power level is monitored by a sensor controller. In an example, sensor controller 514 may be monitoring the power level flowing from primary power source 520 to network tap 506.

At a next step 606, the sensor controller determines if a power disruption has occurred. In an example, sensor controller 514 may be comparing the power level flowing from primary power source 520 against a predefined threshold. If the power level is above the predefined threshold, power continues to flow from primary power source (step 602).

However, if the power level is below the predefined threshold, the sensor controller may make a determination if an alternative path has already been established (step 608). In an example, if power is currently being flowing from primary power source 520, then an alternative path is not currently established. Thus, when sensor controller 514 makes a determination that a power drop has occurred, sensor controller 514 may close a set of relays to create an alternative path (step 610). In an embodiment of the invention, a set of capacitors may be available to provide a source of temporary power to network tap 506 in order to maintain the current communication link in order to provide set of relays 522 sufficient time to establish an alternative path for data traffic to flow between Network A and Network B (step 612).

However, if an alternative path has already been established, then the data traffic continues to flow through the alternative path (step 612).

Figure 6B:
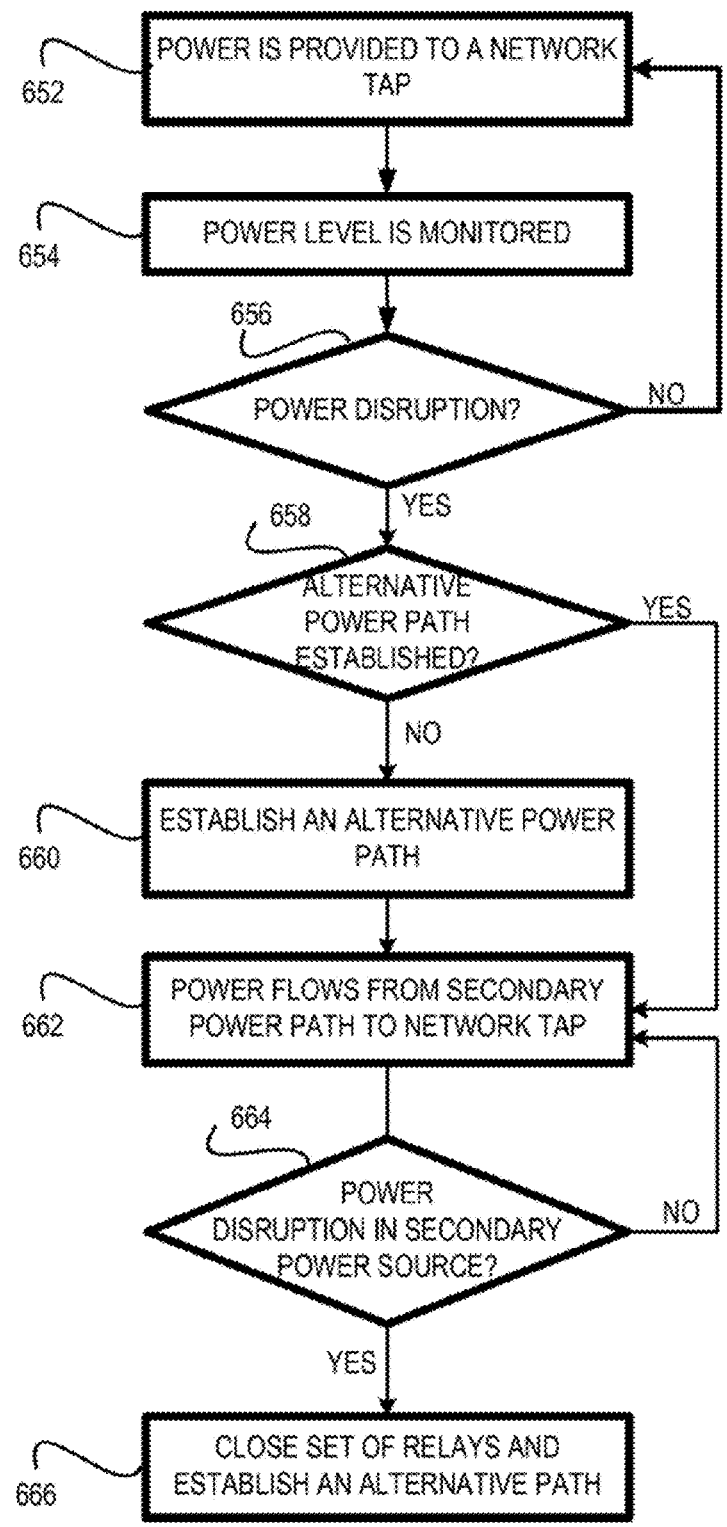
FIG. 6B shows, in an embodiment of the invention, a simple flow chart illustrating a method for maintaining a link when no power source is available to provide power to a network tap.

FIG. 6B shows, in an embodiment of the invention, a simple flow chart illustrating a method for maintaining a link when no power source is available to provide power to a network tap.

At a first step 652, power is provided to a network tap, which is configured to monitor data traffic flowing between two network devices. In an example, primary power source 520 is turned on.

At a next step 654, power level is monitored by a sensor controller. In an example, sensor controller 514 may be monitoring the power level flowing from primary power source 520 to network tap 506. In an embodiment, sensor controller 514 may also be monitoring the power level of a secondary power source (such as a 12 volt battery). If the secondary power source is low, part of power flowing from primary power source 520 is diverted to charge the secondary power source.

At a next step 656, the sensor controller determines if a power disruption has occurred. In an example, sensor controller 514 may be comparing the power level flowing from primary power source 520 against a predefined threshold. If the power level is above the predefined threshold, power continues to flow from primary power source (step 652).

However, if the power level is below the predefined threshold, the sensor controller may then make a determination if an alternative power path has already been established (step 658) In an example, if power is currently flowing from primary power source 520, then an alternative power path is not currently established. Thus, when sensor controller 514 makes a determination that a power drop has occurred, an alternative power path may be established (step 660) and power begins to flow from the secondary power source (step 662). In other words, sensor controller 514 may activate the secondary power source to provide power to network tap 506. Thus, power is provided to network tap to enable the communication links to be maintained and network tap 506 to continue monitoring the data traffic flowing through the network.

However, if an alternative power path has already been established, then power continues to flow from the secondary power source (step 662).

At a next step 664, the sensor controller may make a determination if sufficient power from the secondary power source is available to support the network tap. If the power level is above a predefined threshold, then power continues to flow from the secondary power source (step 662).

However, if both the primary and secondary power sources are not available, then at a next step 666, sensor controller 514 may close a set of relays to create an alternative path. In an embodiment of the invention, a set of capacitors may be available to provide a source of temporary power to network tap 506 in order to maintain the current communication link in order to provide set of relays 522 sufficient time to establish an alternative path for data traffic to flow between Network A and Network B. In other words, when both power sources are not available, the set of relays may create a direct communication link between the two network devices. Since a master-slave relationship has already been established, no auto-negotiation is required to set up the new path.

As can be appreciated from FIGS. 5 and 6A-6B, an arrangement and methods are provided for maintaining a link when power disruption may occur causing the network tap to go offline. By monitoring the power level, an alternative path may be established to maintain the link between two network devices. Thus, even though the network tap may no longer be available to monitor the data traffic, an alternative data path may be established. As a result, financial losses that may be experienced due to latency delay may be minimized.

Figure 7:
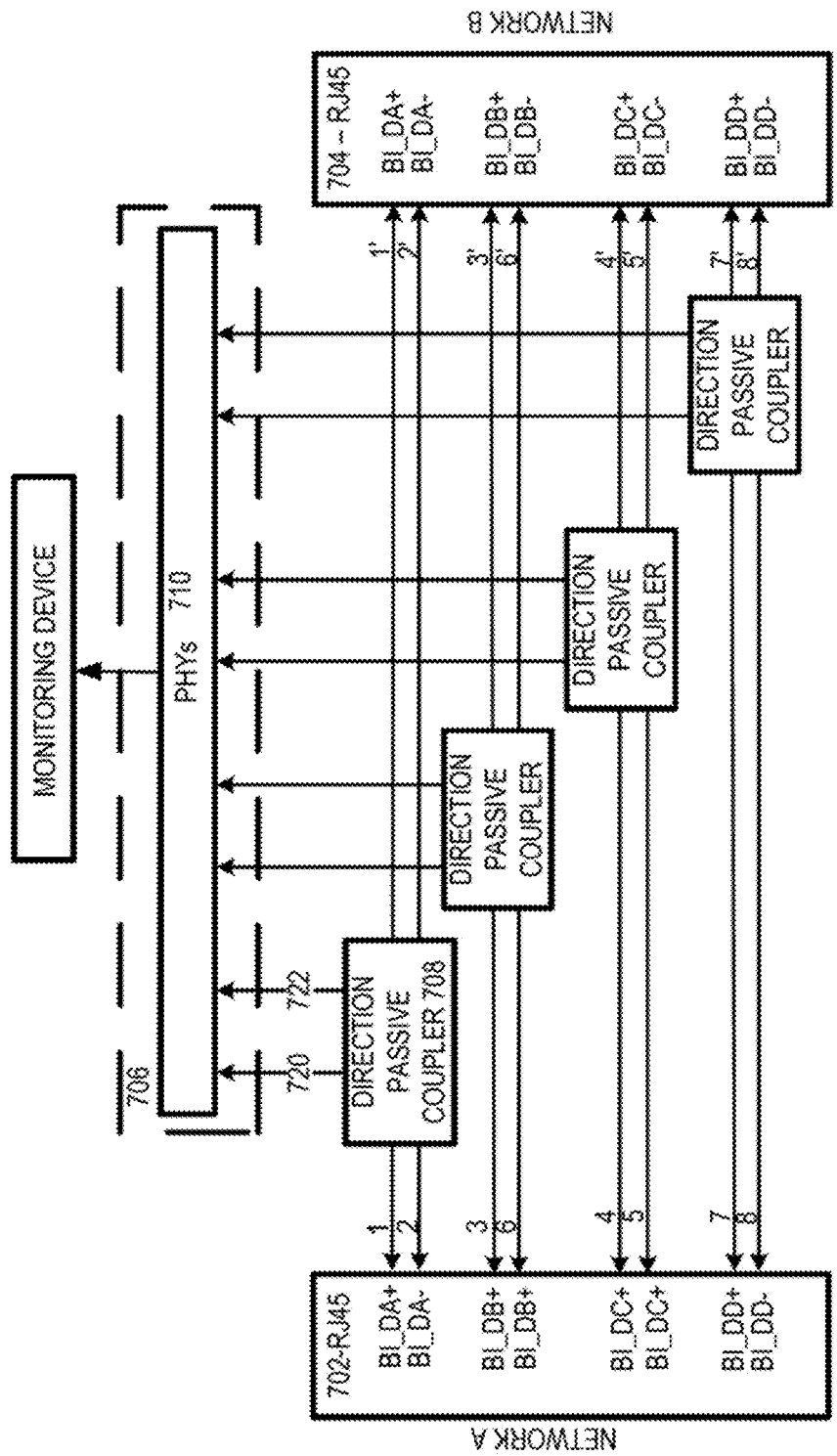
FIG. 7 shows, in an embodiment of the invention, a simple block diagram illustrating an arrangement for maintaining zero delay within a fast Ethernet environment.

FIG. 7 shows, in an embodiment of the invention, a simple block diagram illustrating an arrangement for maintaining zero delay within a fast Ethernet environment. Consider the situation wherein, for example, data traffic is flowing between two network devices, between a port 702 of Network A and a port 704 of Network B. Both port 702 and port 704 may be RJ45 jacks that support Ethernet over twisted pairs. To monitor the data traffic, a gigabit network tap 706 may be provided.

In an embodiment, a set of PHYs 710 may be configured to assign data traffic flowing from each specific twisted pair pins along a designated data path. In an embodiment, a set of direction passive couplers 708 may be employed to direct traffic to network tap 706 along the designated data paths. Set of direction passive couplers 708 may be configured to at least receive a copy of the data traffic, determine the direction of the data traffic and route the data traffic through a designated path. In an example, data traffic flowing from twisted pair pins 1-2 of port 702 may be directed by set of direction passive couplers 708 along a path 720. In another example, data traffic flowing from twisted pair pins 1'-2' of port 704 may be directed by set of direction passive couplers 708 along a path 722. Since data traffic is flowing into set of PHYs 710 along a designated path, set of PHYs 710 is able to route the data traffic onward to one or more monitoring devices.

As can be appreciated from FIG. 7, an arrangement is provided for providing zero delay in a faster Ethernet environment. Given that the inline set of direction passive couplers is passive and does not require power, the possibility of auto-negotiation due to power disruption is substantially eliminated. Thus, even if the network tap suffers power disruption, the power situation of the network tap does not affect the communication link between Network A and Network B.

As can be appreciated from the foregoing, arrangements and methods are provided for maintaining a communication link between two network devices with minimal or even zero delay. By providing a secondary power source, an alternative power source may be provided to maintain the communication link between the two network devices and a network tap. With a temporary power source through a set of capacitors, the loss of power to the network tap may be temporarily delay to provide a new alternative path to be established while still maintaining the current communication link. Thus, disruption to a company's network traffic may be substantially minimized, thereby, enabling the company to maintain its quality of service and limit its financial loss.

In another aspect of the invention, methods and arrangements are provided for minimizing delay in a high-speed tap arrangement. Embodiments of the invention relates to hardware and software arrangements and methods for quickly switching the transmission path for data between a primary data path and a bypass data path. The switching is accomplished rapidly using set of powered analog switches and a relay to minimize packets loss in the event of power loss. Further, when power is restored, software and hardware methods and arrangements disclosed herein permit the data path to be promptly restored resulting in the restoration of tapping ability quickly after power is restored.

As aforementioned, by increasing the speed by which a communication link between network devices switch from a primary data path mode to a bypass data path mode, latency is minimized and the ability to maintain the communication link is enhanced. The inventors herein realized that by employing a relay with a faster switching capability, the communication link between the network devices may be better maintained.

In a typical tap arrangement, a mechanical relay that may be employed may have a switching performance rate of about 1 milliseconds. Instead, the high-speed tap arrangement may employ, in an embodiment of the invention, a solid state relay with a fast switching performance rate of about 0.1-0.25 milliseconds.

In another embodiment of the invention, the high-speed tap arrangement may include a high-speed analog switch with a performance rate of around 10 nanoseconds, which makes the analog switch 10,000-100,000 faster than an analog switch that can be typically found in a tap. In an embodiment, the analog switch is a powered analog switch.

In an embodiment of the invention, a power management module (such as a sensor controller) is provided for monitoring the power flowing through the high-speed tap arrangement. In an embodiment, the sensor controller may be configured to compare actual power flow against a predefined powered-down threshold. If the power level is below a predefined powered-down threshold, an alternate path between the network devices may be established to minimize packet loss when power is actually lost. Even though the high-speed tap arrangement is no longer monitoring the data traffic flowing through the network, the ability to maintain the communication link between the network devices is important to prevent network disruption and ensure continual quality of services.

In an embodiment of the invention, a logic module is provided for gathering transmission parameters during an active communication link between the network devices and the high-speed tap arrangement. The transmission parameters may be stored and be made available for programming a set of PHYs within the high-speed tap arrangement when power is restored after a power failure.

Figure 8:
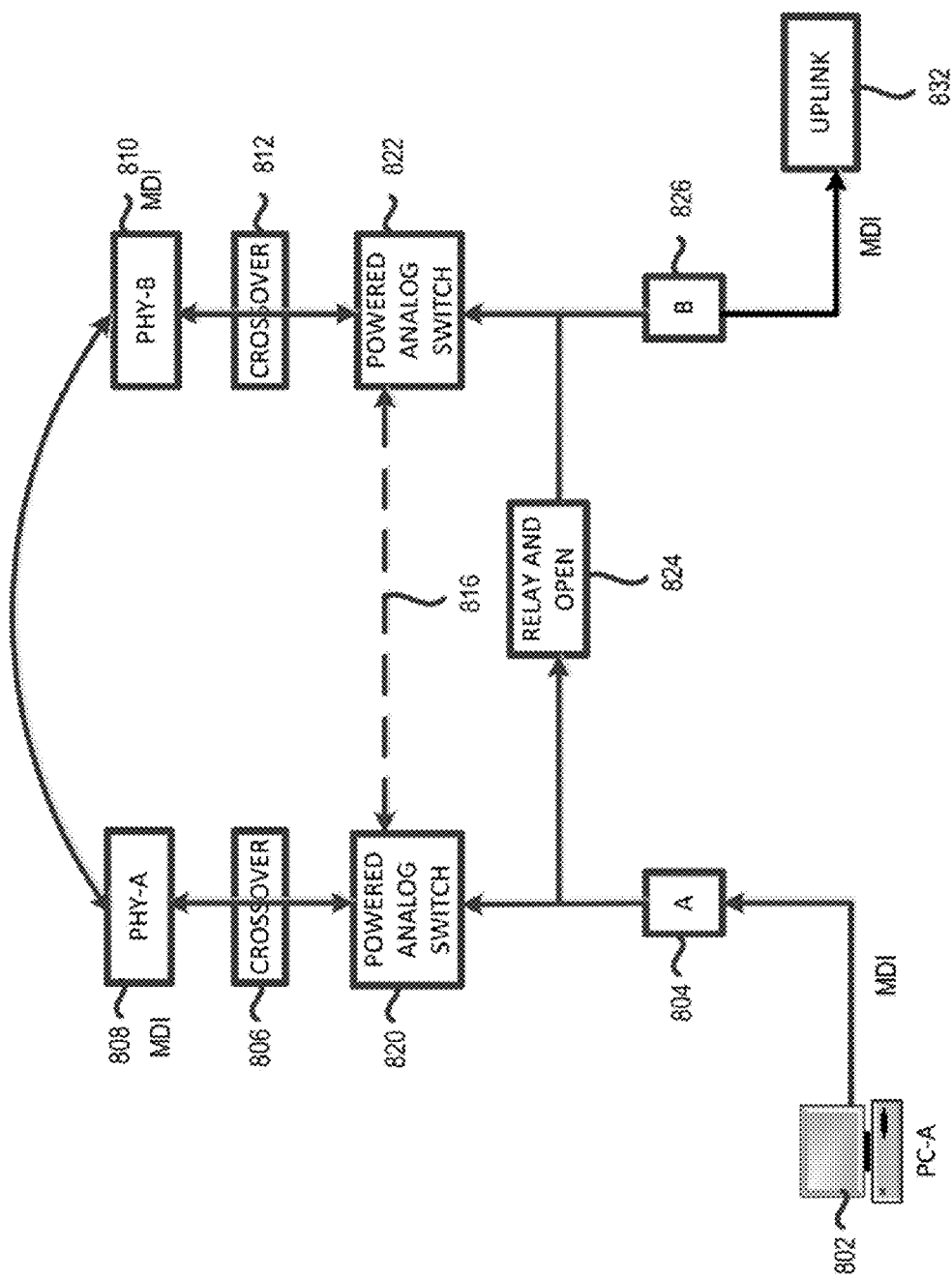
FIG. 8 shows, in an embodiment of the invention, a simple block diagram illustrating a data flow arrangement in a high-speed Ethernet environment (at least 1 gigabit) with a high-speed tap arrangement.

To facilitate discussion, FIG. 8 shows, in an embodiment of the invention, a simple block diagram illustrating a data flow arrangement in a high-speed Ethernet environment (at least 1 gigabit) with a high-speed tap arrangement. Consider the situation wherein, for example, data traffic is flowing between network devices 802 and 832. As aforementioned, a link has to be established between the high-speed tap arrangement and each of the network devices (802 and 832). In an embodiment of the invention, the high-speed tap arrangement may include a set of PHYs, such as PHY-A 808 and PHY-B 810 for establishing communication links with the network devices.

Consider the situation wherein, for example, the transmission parameters of a previous communication link between the network devices do not exist or are no longer valid. In an embodiment, auto-negotiation may be employed to determine transmission parameters required to establish links between the high-speed tap arrangement and each of the network devices since data traffic in a high-speed Ethernet environment tends to be bidirectional and unpredictable. During auto-negotiation, the network devices and the high-speed tap arrangement share their transmission parameter capabilities. During auto-negotiation, common transmission parameters are established in which the highest performance transmission parameters supported by all devices are selected. These transmission parameters may include the duplex mode (full or half), transmission speed, flow control (master vs. slave), and port interface type (MDI vs. MDIX). For example, the devices are full-duplex devices, transmitting over a 1 gigabits Ethernet environment.

In an embodiment, when the high-speed tap arrangement is first powered on, a master-slave mode may be established between PHY-A 808 and PHY-B 810. In an example, once the auto-negotiation has occurred and the transmission mode of the network devices has been determined, the corresponding master-slave mode may be established for PHY-A 808 and PHY-B 810. For example, if network device 802 is set to a master mode and network device 832 is set to a slave mode, then PHY-A 808 is set to a slave mode while PHY-B 810 is set to a master mode. In an embodiment, crossover functionality (such as crossover cables 806 and 812) may be employed to ensure that the correct port interface mode (MDI vs. MDIX) is utilized and that the data can be transmitted and received by the devices. As can be appreciated, crossover functionality may be achieved by utilizing crossover cables or by employing internal crossover capability such as Auto-MDI/MDIX.

In an embodiment, the communication link settings (transmission parameters) may be gathered by the high-speed tap arrangement and may be saved for future reference. For example, consider the situation in which the high-speed tap arrangement monitoring the network traffic has stored transmission parameters. Once powered on, the master-slave mode for PHY-A 808 and PHY-B 810 may be automatically programmed based on the saved transmission parameters from the last communication link. In an example, since network device 802 has been set up as the master and network device 832 has been set up as the slave, PHY-B 810 may be set up in a master mode while PHY-A 808 may be set up in a slave mode to enable the same communication link to be maintained. Once the set of PHYs have been programmed, the communication link between the set of PHYs and the network devices are tested to ensure that the stored transmission parameters are still valid. If a valid communication link is established, auto-negotiation may not be needed and the high-speed tap arrangement may begin monitoring the data traffic flowing between the network devices. However, if the transmission settings between the network devices have been changed, then auto-negotiation may be performed (as mentioned above) to establish a new communication link between the high-speed tap arrangement and the network devices.

The high-speed tap arrangement may be powered by a power source (e.g., 12 volt power adaptor). In an embodiment of the invention, a power management module (such as a sensor controller) may be employed to monitor the power flowing from the power source and the high-speed tap arrangement. In an embodiment, if the sensor controller identifies a power drop (such as below a predefined powered-down threshold), the sensor controller may activate relay 824 to establish an alternate path.

In an example, power to the high-speed tap arrangement is powered off. In an embodiment, the sensor controller may be configured to compare power flowing from the power source against a predefined powered-down threshold (e.g., 10 percent). If the power coming from the power source falls below a predefined powered-down threshold, the sensor controller may be configured to establish a secondary path (bypass data path) via relay 824 to maintain the communication link between the network devices (802 and 832).

Even though relay 824 is significantly faster than a mechanical relay, between 0.1-0.25 milliseconds may still be required to close the relay to create the bypass data path. In an embodiment, a temporary alternate path may be established using a set of powered analog switches (820 and 822). Powered analog switches 820 and 822 are low-powered components that may be activated when power to the high-speed tap arrangement falls below a predefined powered-down threshold. Since the delay time required to activate the powered analog switches is about 10 nanoseconds, the powered analog switches provided a significantly low cost and low risk arrangement for quickly creating a temporary data path while the relay 824 is being closed and the bypass data path is being established.

In an example, when the sensor controller identifies the potential for power disruption, the data path is diverted to a temporary data loop established by the powered analog switches 820 and 822. For example, data traffic is transmitted from network device 802 through connector 804 through powered analog switch 820. From there, the data traffic flows along temporary data loop 816 to be received by powered analog switch 822 and forwarded onward through network devices 832 via connector 824. Since a master-slave relationship has already been established, auto-negotiation is not required to set up the temporary data path between network devices 802 and 832.

Figure 9:
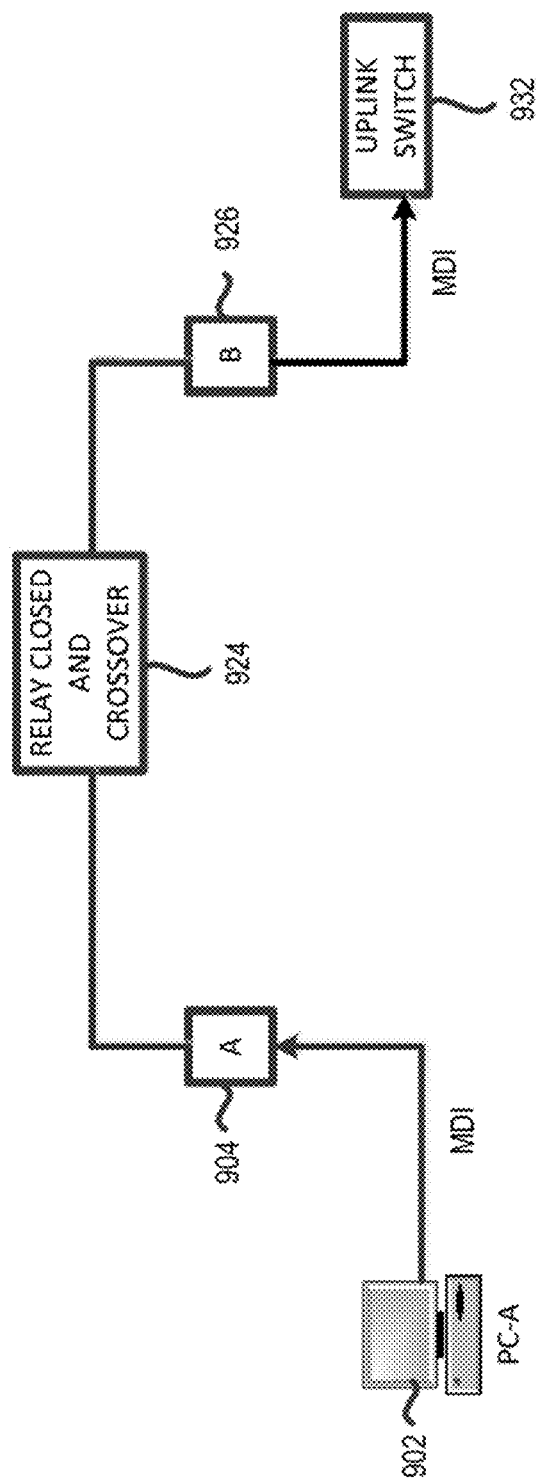

Once relay 824 has established the bypass data path, powered analog switch 820 and 822 may be powered off and the temporary data loop is broken. Similarly, since the master-slave relationship between the two network devices have already been established, auto-negotiation may not be required in setting up the bypass data path. FIG. 9 shows, in an embodiment of the invention, an example of the bypass data path when no high-speed tap arrangement is powered on. For example, a communication link is established directly between two network devices 902 and 932 through a relay 924 via connectors 904 and 926, respectively. In an embodiment, a crossover component (either externally or internally) may be associated with relay 924 to ensure that the communication link is not impacted by the port interface type associated with each network device.

Figure 10:
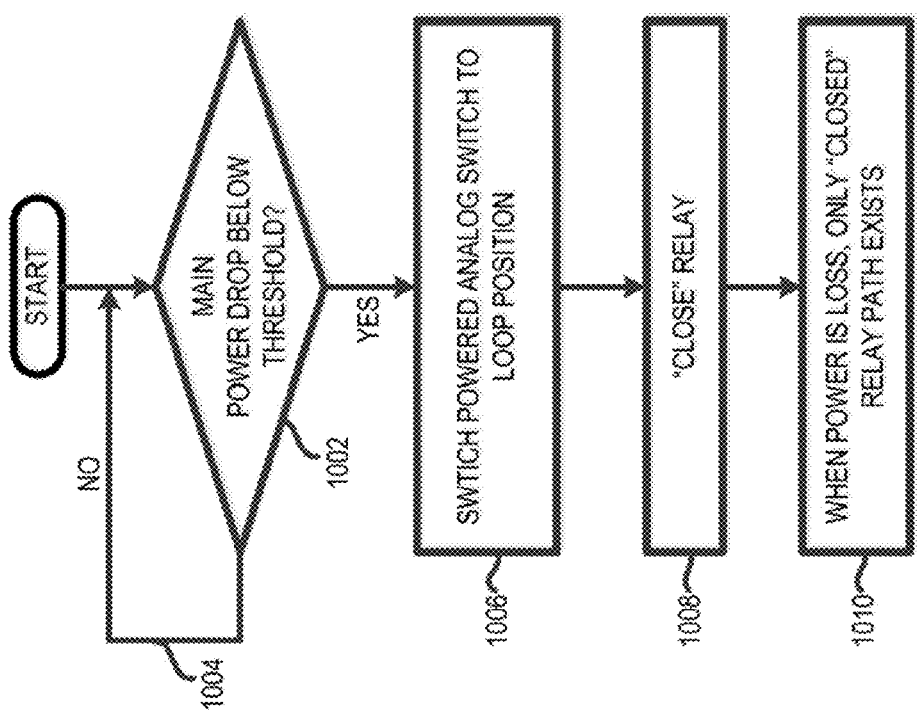
FIG. 10 shows, in an embodiment of the invention, a simple flow chart illustrating a method for handling transition from a power-on to a power-off state.

FIG. 10 shows, in an embodiment of the invention, a simple flow chart illustrating a method for handling transition from a power-on to a power-off state.

Consider the situation wherein, for example, a high-speed tap arrangement is monitoring data traffic within the network.

At a first step 1002, the state machine may check the status of the power flowing to the high-speed tap arrangement. If the power level is above a predefined powered-down threshold, the state machine may continue to monitor the power status (step 1004). In an embodiment, the predefined powered-down threshold may be user configurable. In another embodiment, the predefined powered-down threshold may be based on the performance rate of the solid state relay employed and/or the set of powered analog switches.

However, if the power level is below the predefined powered-down threshold, at a next step 1006, the state machine may move the powered analog switches to a loop position. In an example, a data path exists in which data traffic is flowing between the network devices via the set of PHYs in the high-speed tap arrangement. However, once the high-speed tap arrangement is determined to be powering off, the set of powered analog switches that exists between the network devices and the high-speed tap arrangement may be activated and a temporary data loop is created to maintain the communication link between the network devices. In an embodiment, each powered analog switch is a low voltage component with a high switching performance rate (about 10 nanoseconds). Thus, when power is still available, the powered analog switch may be employed in maintaining the current communication link while the relay is trying to establish the direct communication link between the network devices.

At a next step 1008, the relay may be closed. In an embodiment of the invention, a solid state relay may be employed to handle the transition from a primary data path mode to a bypass data path mode. The solid state relay tends to be faster than a mechanical relay; hence, by employing a solid state relay in establishing the bypass data path, the communication link may be maintained between the network devices without incurring significant data packet loss or experiencing latency.

At a final step 1010, power loss to the high-speed tap arrangement is completed and the bypass data path via the closed relay is established. With a considerably faster relay, the risk of losing the communication link may be significantly minimized and the potential for financial loss due to data packet loss is substantially eliminated.

Figure 11:
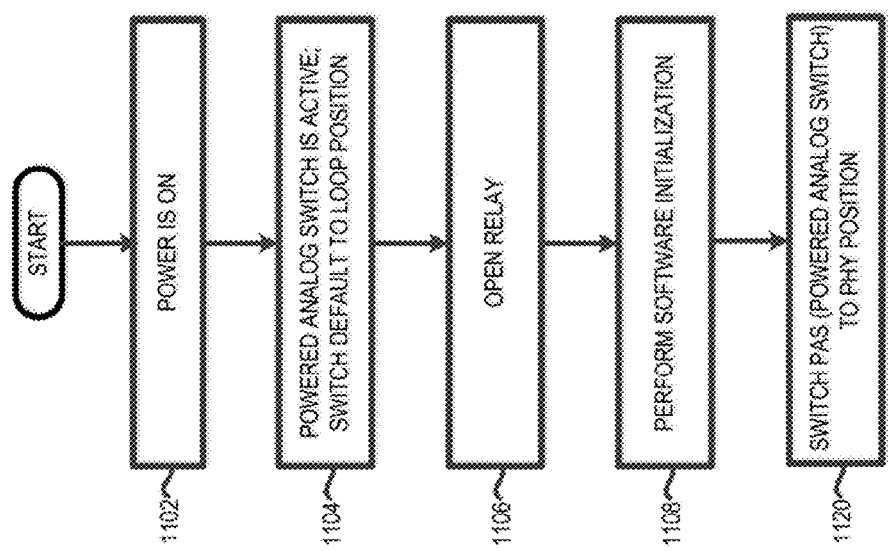
FIG. 11 shows, in an embodiment of the invention, a simple flow chart illustrating a method for handling transition from a power-off to a power-on state.

FIG. 11 shows, in an embodiment of the invention, a simple flow chart illustrating a method for handling transition from a power-off to a power-on state.

Consider the situation wherein, for example, a direct communication link between network devices is established through a relay. In this environment, no tap arrangement is currently monitoring the data traffic flow.

At a first step 1102, power is detected. In an embodiment, a power management module (such as a sensor controller) may be employed to determine the status of the power flowing through the network. In an embodiment, the power level is compared against a predefined power-up threshold.

If the power status is above a predefined power-up threshold, the state machine may activate a set of powered analog switches while deactivating the relay. For example, at a next step 1104, the set of powered analog switches may be set to a loop position. Since the set of powered analog switches utilizes a low voltage, very little power is required to activate the set of powered analog switches and to establish a temporary data path.

Once the temporary data path has been established, the relay may be opened, thereby deactivating the bypass data path mode (at a next step 1106).

Meanwhile the high-speed tap arrangement may be initialized at a next step 1108. In an embodiment, the initialization step may include turning on the processor and the chip and establishing and verifying the links between the high-speed tap arrangement and each of the network devices.

Once the initialization has been completed, at a next step 1110, the powered analog switch may be moved to a PHY position and the temporary loop data path is deactivated and the primary data path is established.

Figure 12:
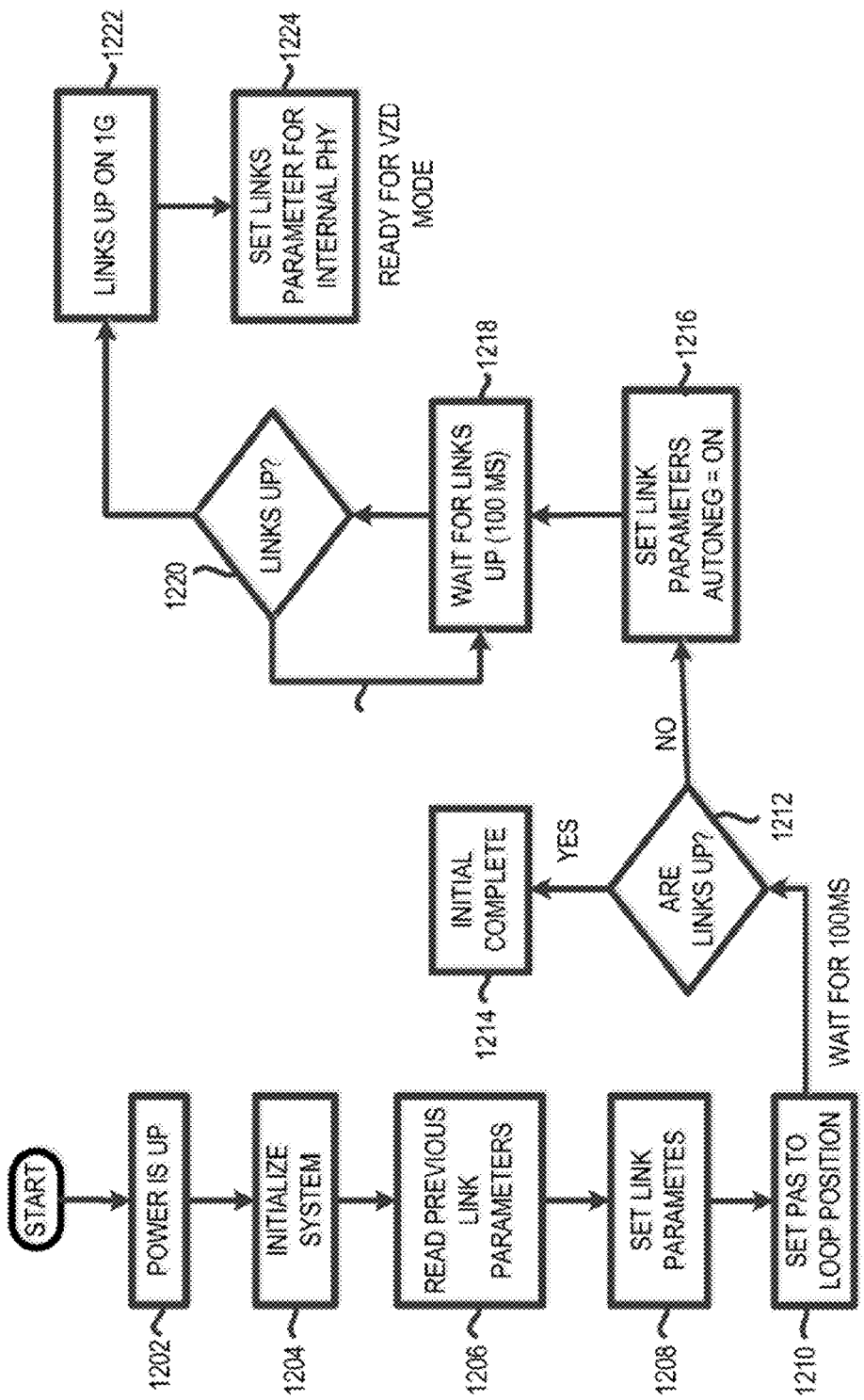
FIG. 12 shows, in an embodiment of the invention, a simple flow chart illustrating a software method for establishing a communication link between two network devices that are being monitored by a high-speed tap arrangement.

FIG. 12 shows, in an embodiment of the invention, a simple flow chart illustrating a software method for establishing a communication link between two network devices that are being monitored by a high-speed tap arrangement.

Consider the situation wherein, for example, data traffic within a network is being monitored by a high-speed tap arrangement.

At a first step 1202, the state machine may detect power. In an example, a power management module (such as a sensor controller) may be monitoring power flowing through the network and may be comparing the power level against a predefined power-up threshold.

Once the power level is above the predefined power-up threshold, initialization may be started. For example, once the power management module has identified that there is sufficient power, the system (e.g., boot the processor, initialize the chip, etc.) of the high-speed tap arrangement may be initialized (at a step 1204).

At a next step 1206, the state machine may retrieve the stored transmission parameters from the previous communication link. For example, during the last communication link, the PHY-A was in the slave mode and the PHY-B was in the master mode.

At a next step 1208, the state machine may program the set of PHYs of the high-speed tap arrangement with the stored transmission parameters (such as duplex mode, flow control, port interface type, and transmission speed).

At a next step 1210, the power analog switches may be set to a PHY position. As aforementioned in FIG. 11, prior to the initialization of the high-speed tap arrangement, the state machine may be in a bypass data path mode wherein the relay may be closed and a direct communication link may exist between the two networks. When power is detected, the powered analog switches may be activated and a temporary data path may be established through the powered analog switches. Thus, once the high-speed tap arrangement has completed the initialization state, the powered analog switches may be moved to a PHY position so that the data path may now be flowing through the set of PHYs.

At a next step 1212, the state machine may perform a check to determine if the communication link is valid. This check may take a few milliseconds. If the communication link is valid (at a next step 1214), then a primary data path has been established between the high-speed tap arrangement and each of the network devices.

However, if the communication link is not valid, then at a next step 1216, auto-negotiation may be performed to determine the new transmission parameters. For example, PHY-A 808 may auto-negotiate with network device 802 and PHY-B may auto-negotiate with network device 832 to determine the two separate links.

Once the auto-negotiation is completed, at a next step 1218, the state machine may wait for the two separate links to be established. This step may take a few milliseconds.

At a next step 1220, the state machine may verify that the two separate links with the two network devices are valid. If the links have not been established, than the state machine may continue to wait.

However, if the links have been verified, then two valid separate links exist between the high-speed tap arrangement and each network device (at a next step 1222).

Usually, a communication link is established at the highest possible transmission parameters that are common to all devices in the communication link. Thus, a possibility may exist in that once the separate links are connected to form a communication link a mismatch of at least one of the transmission parameters may occur. For example, the speed in the first link may be different than the transmission speed in the second link. To prevent performance issue, the transmission parameters that are different may be hard set (programmed the set of PHYs) (step 1224). In an embodiment, the new transmission parameters may be stored for future usage. For example, power disruption may occur in the near future and the set of PHYs may have be reprogrammed when powered is available again.

As can be appreciated from FIGS. 8-12, arrangements and methods are provided for maintaining a communication link when power disruption may occur. By employing components with faster response time, alternative data path may be established to maintain the link between the network devices. Thus, even though power disruption may occur, the possibility of a communication link disconnection is minimized. As a result, data packet loss and financial losses that may be experienced due to latency delay may be minimized.

Figure 13:
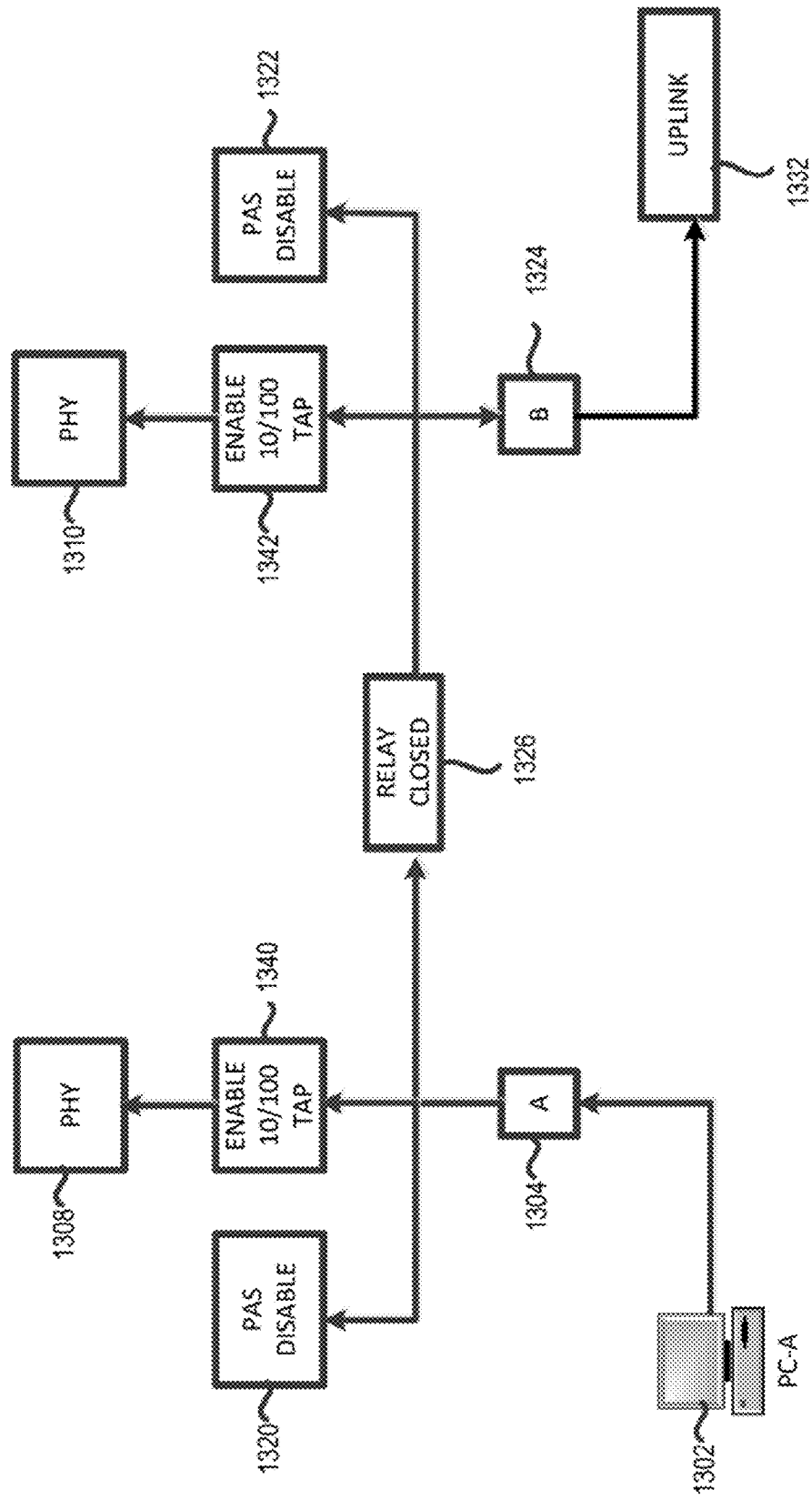
FIG. 13 shows, in an embodiment of the invention, a situation with a multiple-speed network tap arrangement.

FIG. 13 shows, in an embodiment of the invention, an arrangement with a multiple-speed network tap arrangement (10/100 megabytes, 1 gigabits, 10 gigabits, etc.). In a typical network environment, data traffic may be flowing between network devices (1302 and 1332). Between both network devices may be connectors 1304 and 1326 (ex., RJ45 jacks that support Ethernet-over-twisted pairs).

Consider the situation wherein, for example, the highest transmission speed supported by the network is 10/100 megabytes. Those skilled in the arts are aware that in a 10/100 megabytes network environment, the direction of the data traffic between two network devices may be known and uni-directional. In an example, twisted pair pins 1-2 of network device 1302 and twisted pair pins 1'-2' of network device 1332 may be designated as the transmitting pairs while twisted pair pins 3-6 of network device 1302 and twisted pair pins 3'-6' of network device 1332 may be designated as the receiving pairs. For example, data traffic may flow from twisted pair pins 1-2 of network device 1302 and be received by twisted pair pins 3'-6' of network device 1332. Similarly, data traffic coming in from network device 1332 may flow from twisted pair pins 1'-2' to be received by twisted pair pins 3-6 of network device 1302.

Given that the directional flow within a 10/100 megabytes Ethernet environment is known, a multiple-speed network tap arrangement may be configured to tap into the network in order to monitor the data traffic flowing between the two network devices. In an example, data traffic flowing may be transmitted from twisted pair pins 1-2 of network device 1302 through connector 1304 and be received by a twisted pair pins 3'-6' of a 10/100 megabytes port 1340. The data traffic is then forward through a closed relay 1324 to twisted pair pins 1-2 of 10/100 megabytes port 1342. From there the data traffic is forwarded through connector 1326 to twisted pair pins 3'-6'.

Given that the data traffic is flowing through a path with a closed relay (1324), power disruption to the multiple-speed network tap arrangement has substantially little impact on the data traffic (zero delay). Thus, latency and data packet loss may be substantially minimal. Discussion about zero delay on 10/100 megabytes tap is provided in a related application entitled "Zero-Interrupt Network Tap," filed Apr. 28, 2004 by Matityahu et al. (application Ser. No. 10/834,448), all of which are incorporated herein by reference.

In an embodiment, the multiple-speed network tap arrangement may include components similar to those discussed in FIG. 8. For example, a set of powered analog switches (1320 and 1322) may be included and may become active when the transmission speed between the network devices is at least 1 gigabits. In another example, relay 1326 may be a solid state relay with crossover functionality. Thus, relay 1326 is configured to handle data traffic regardless of transmission speed. In yet another embodiment, the multiple-speed network tap arrangement may also include a set of PHYs (1308 and 1310). In a 10/100 megabytes environment, copies of the data traffic may be forwarded to monitoring devices via the set of PHYs. In a faster Ethernet environment, the set of PHYs may be configured to establish a set data path by which the multiple-speed network tap arrangement may be able to monitor the data traffic. Similar to FIG. 8, the multiple speed network environment may also include crossover modules enabling the multiple-speed network tap arrangement to support the correct port interface mode.

Figure 14:
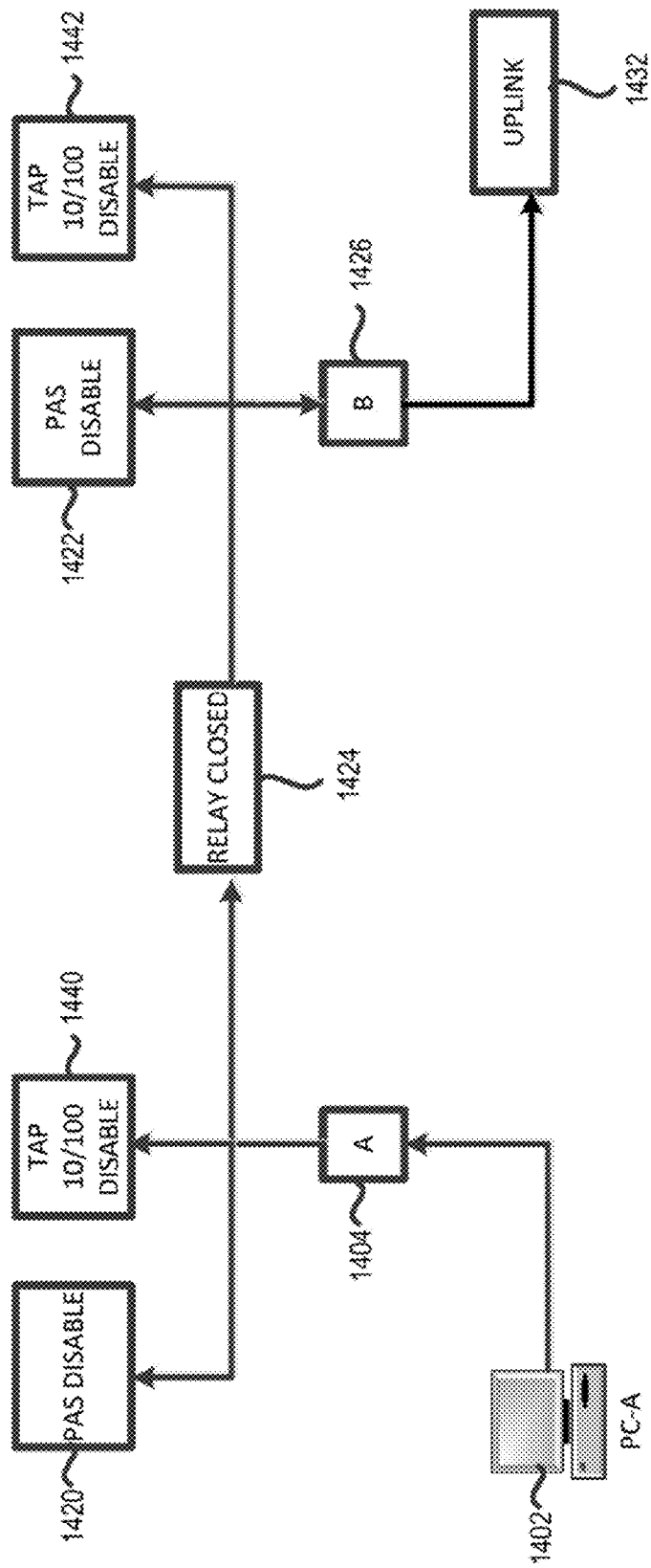
FIG. 14 shows, in an embodiment of the invention, a simple block diagram illustrating a bypass data path in which the multiple-speed network tap arrangement is disabled.

FIG. 14 shows, in an embodiment of the invention, a simple block diagram illustrating a bypass data path in which the multiple-speed network tap arrangement is disabled. Similar to FIG. 9, network traffic flowing between network devices 1402 and 1432 is flowing through a relay 1324 via a set of connectors 1304 and 1326. As can be appreciated from the foregoing, given that the multiple-speed network tap arrangement is powered off, the components (such as powered analog switches 1320 and 1322 and 10/100 megabytes ports 1340 and 1342) associated with the multiple-speed network tap arrangement may also be disabled.

As can be appreciated from FIGS. 13-14, arrangements are provided for providing zero delay regardless of the transmission speed of the network environment. By incorporating functionality for supporting multiple speeds in combination with a faster relay and a set of powered analog switches, a single arrangement may be employed to monitor network traffic regardless of transmission speed of the network environment. Thus, the cost of ownership is reduced while enhancing tap capability.

As can be appreciated from the foregoing, hardware and software arrangements and methods are provided for maintaining a communication link between two network devices with minimal or even zero delay. By providing a set of powered analog switches and a faster relay, a bypass data path may be quickly established to maintain the communication link between the two network devices without experiencing significant data packet loss or latency. In addition, by enabling multiple transmission speeds within a single tap arrangement, cost of ownership is minimized while enhancing a company's flexibility to handle different network environments.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A monitoring device for enabling monitoring of data traversing between a first network device and a second network device through a network, comprising:
    a primary data path that routes said data for monitoring;
    a secondary data path that routes said data in a manner that bypasses said monitoring;
    a sensor for monitoring power level supplied to said monitoring device;
    a relay for switching from said primary data path to said secondary data path if said power level falls below a predefined level;
    a set of analog switches controlled by a state machine of said monitoring device for establishing a temporary data path to ensure at least a portion of said data continues to traverse between said first network device and said second network device while said relay attempts to perform said switching.

2. The monitoring device of claim 1 wherein said relay is a solid state relay.

3. The monitoring device of claim 1 wherein said set of analog switches has a faster response rate than a response speed of said relay.

* * * * *